(12) United States Patent
Noda et al.

(10) Patent No.: US 12,449,725 B2
(45) Date of Patent: Oct. 21, 2025

(54) LENS APPARATUS

(71) Applicant: CANON KABUSHIKI KAISHA, Tokyo (JP)

(72) Inventors: Atsuto Noda, Tokyo (JP); Taro Murakami, Tokyo (JP); Kiyoshi Nitto, Saitama (JP); Takumi Uehara, Kanagawa (JP); Hiroki Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 731 days.

(21) Appl. No.: 17/830,599

(22) Filed: Jun. 2, 2022

(65) Prior Publication Data

US 2022/0397816 A1    Dec. 15, 2022

(30) Foreign Application Priority Data

Jun. 11, 2021 (JP) .................................. 2021-097777
Sep. 27, 2021 (JP) .................................. 2021-156696

(51) Int. Cl.
*G03B 35/10* (2021.01)
*G02B 13/06* (2006.01)
(Continued)

(52) U.S. Cl.
CPC ............. *G03B 35/10* (2013.01); *G02B 13/06* (2013.01); *G03B 17/14* (2013.01); *G03B 17/17* (2013.01); *H04N 13/207* (2018.05); *H04N 23/55* (2023.01)

(58) Field of Classification Search
CPC ........ G03B 35/10; G03B 17/14; G03B 17/17; G02B 13/06
See application file for complete search history.

(56) References Cited

U.S. PATENT DOCUMENTS 4,457,604 A * 7/1984 Tsuboi ................. G03B 11/043
                                                              396/205
2013/0027792 A1    1/2013 Miyamoto et al.
(Continued)

FOREIGN PATENT DOCUMENTS

EP    3796650 A     3/2001
EP    3652577 A1    5/2020
(Continued)

OTHER PUBLICATIONS

The above foreign patent documents were cited in the Feb. 6, 2024 Japanese Office Action, a copy of which is enclosed without an English Translation, that issued in Japanese Patent Application No. 2021-097777.

(Continued)

*Primary Examiner* — Lucy P Chien
(74) *Attorney, Agent, or Firm* — Cowan, Liebowitz & Latman, P.C.

(57) ABSTRACT

A lens apparatus includes a lens disposed closest to an object, a holder holding the lens, a cover having a first opening to expose the lens when viewed from an optical axis direction of the lens and being positioned with the holder in the optical axis direction, and an exterior member having a second opening to engage with an outer diameter of the cover. A first gap in a diameter direction orthogonal to the optical axis direction formed between the holder and the cover is larger than a second gap in the diameter direction formed between the exterior member and the cover.

42 Claims, 18 Drawing Sheets

(51) Int. Cl.
*G03B 17/14* (2021.01)
*G03B 17/17* (2021.01)
*H04N 13/207* (2018.01)
*H04N 23/55* (2023.01)

(56) References Cited

U.S. PATENT DOCUMENTS

| | | | |
|---|---|---|---|
| 2013/0169761 A1 | 7/2013 | Inoue | |
| 2014/0049615 A1 | 2/2014 | Uwagawa | |
| 2016/0134795 A1* | 5/2016 | Yamakawa | H04N 23/54 348/357 |
| 2017/0102512 A1 | 4/2017 | Yamaoda | |

FOREIGN PATENT DOCUMENTS

| | | |
|---|---|---|
| JP | 01-296205 A | 11/1989 |
| JP | 2001188310 A | 7/2001 |
| JP | 2002-090921 A | 3/2002 |
| JP | 2007-052077 A | 3/2007 |
| JP | 2007-057739 A | 3/2007 |
| JP | 2008203287 A | 9/2008 |
| JP | 2012-003022 A | 1/2012 |
| JP | 2014-006406 A | 1/2014 |
| JP | 2021051282 A | 4/2021 |

OTHER PUBLICATIONS

The above documents were cited in a European Search Report issued on Aug. 31, 2023, a copy of which is enclosed, that issued in the corresponding European Patent Application No. 22177806.1.

The above patent document was cited in a European Search Report issued on Jan. 30, 2023, a copy of which is enclosed, that issued in the corresponding European Patent Application No. 22177806.1.

The above documents were cited in the Feb. 16, 2023 Indian Office Action, a copy of which is enclosed with an English Translation, that issued in Indian Patent Application No. 202244032786.

The above foreign patent document was cited in the May 7, 2024 Japanese Office Action, a copy of which is enclosed without an English Translation, that issued in Japanese Patent Application No. 2021-156696.

* cited by examiner

LENS APPARATUS

BACKGROUND OF THE INVENTION

Field of the Invention

The disclosure relates to a lens apparatus.

Description of the Related Art

An interchangeable lens for stereoscopic photography has conventionally been known as an application of one of interchangeable lens systems. Japanese Patent Laid-Open No. 2012-3022 discloses a lens that includes two optical systems arranged in parallel and images two image circles in parallel on a single image sensor.

In viewing with a VR goggle, it is desirable that an angle of view of a moving or still image is 180 degrees or higher in order to obtain not only a three-dimensional effect but also a realistic effect. In order to provide an image with an angle of view of at least 180 degrees in consideration of manufacturing errors and the like, it is desirable that an imaging lens can capture an image at an angle of view higher than 180 degrees.

However, the lens disclosed in Japanese Patent Laid-Open No. 2012-3022 cannot capture the image at the angle of view higher than 180 degrees. In order to capture the image at the angle of view higher than 180 degrees, it is necessary to place an exterior member on an imaging plane side of a vertex of a front lens so that the exterior member does not shield a light beam of 180 degrees or higher incident on the front lens and to provide openings in the exterior member into which the two lenses can be inserted. In this case, when the positions of the lenses shift, gaps between the opening and the lens become non-uniform, which may deteriorate appearance quality. Moreover, in the case where a drip-proof structure is provided, the non-uniformity of the gaps adversely affects the dust-proof and drip-proof performance. If the opening and the lens are diameter-engaged with each other so that the gaps do not become non-uniform, the position offset of the lens is corrected, which will adversely affect the optical performance and relative relationship between the two optical systems.

SUMMARY OF THE INVENTION

The disclosure provides a lens apparatus capable of maintaining appearance quality, achieving both dust-proof and drip-proof performance and optical performance, and performing stereoscopic imaging at an angle of view higher than 180 degrees.

A lens apparatus according to one aspect of the present invention includes a lens disposed closest to an object, a holder holding the lens, a cover having a first opening to expose the lens when viewed from an optical axis direction of the lens and being positioned with the holder in the optical axis direction, and an exterior member having a second opening to engage with an outer diameter of the cover. A first gap in a diameter direction orthogonal to the optical axis direction formed between the holder and the cover is larger than a second gap in the diameter direction formed between the exterior member and the cover.

Further features of the present invention will become apparent from the following description of exemplary embodiments with reference to the attached drawings.

DESCRIPTION OF THE EMBODIMENTS

Figure 1:
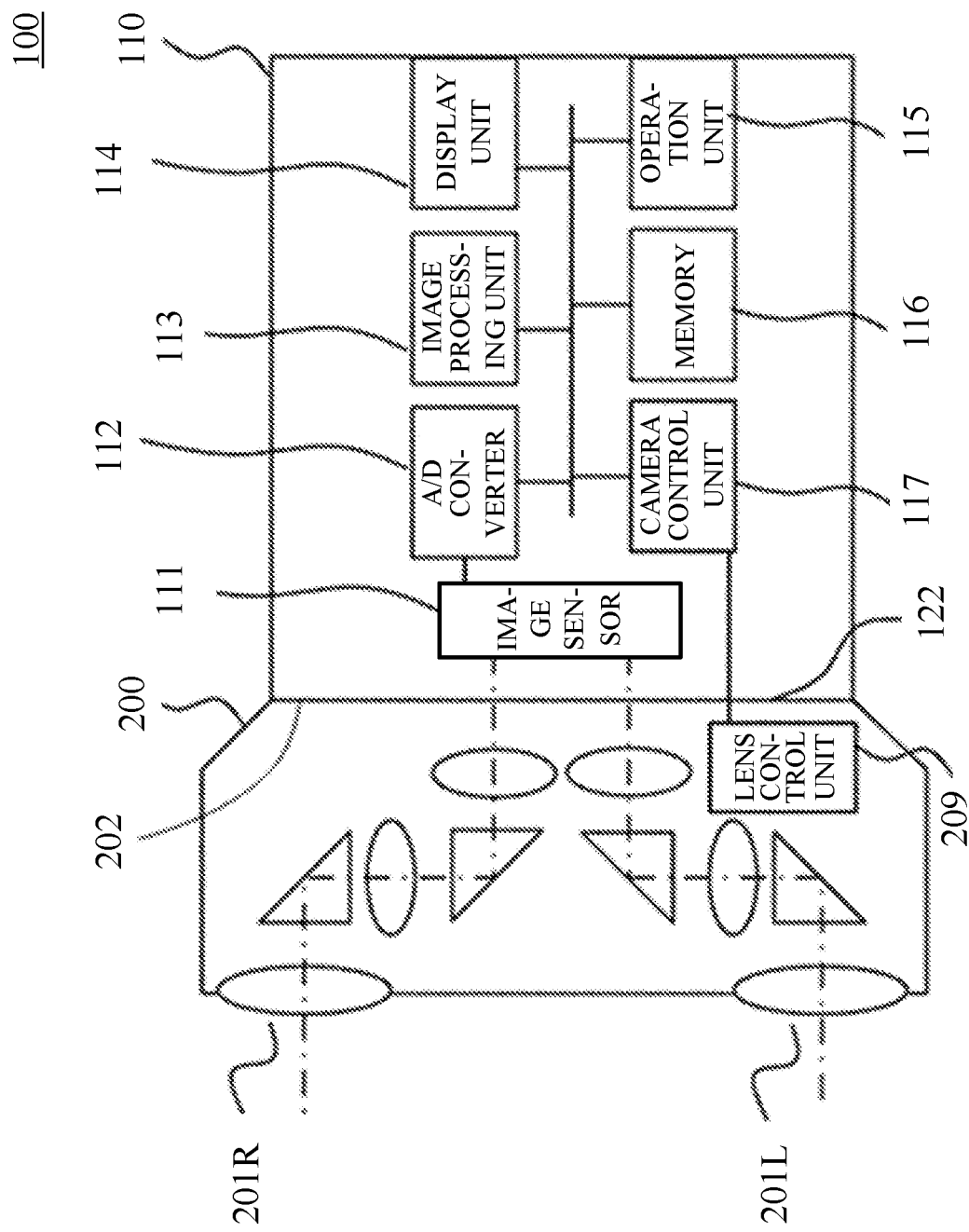
FIG. 1 is a schematic configuration diagram of a camera system according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is a schematic configuration diagram of a camera system 100 according to one embodiment of the disclosure. The camera system 100 includes a camera body (image pickup apparatus) 110 and a lens apparatus (interchangeable lens) 200, and can capture a stereoscopic image.

The camera body 110 includes an image sensor 111, an A/D converter 112, an image processing unit 113, a display unit 114, an operation unit 115, a memory 116, a camera control unit 117, and a camera mount 122.

The lens apparatus 200 includes a right-eye optical system (first optical system) 201R, a left-eye optical system (second optical system) 201L, a lens mount (mount unit) 202, and a lens control unit 209, and is attachable to and detachable from the camera body 110. These two optical systems are arranged in parallel (symmetrically) and configured such that two image circles are imaged in parallel on the image sensor 111. These two optical systems are arranged horizontally and spaced by a predetermined distance (baseline length). When viewed from the imaging plane side (image side), a right image captured by the right-eye optical system 201R is recorded as a moving or still image for the right eye, and a left image captured by the left-left-eye optical system 201L is recorded as a moving or still image for the left eye. The reproduced moving or still images are viewed with a 3D display, VR goggles, or the like, so that the right-eye image is displayed on the right eye of the viewer and the left-eye image is displayed on the left eye of the viewer. At this time, images having a parallax are projected on the right and left eyes depending on the baseline length and provide the viewer with a stereoscopic effect. Thus, the lens apparatus 200 is a lens apparatus for stereoscopic imaging that can capture two images having a parallax using two optical systems.

When the lens apparatus 200 is attached to the camera body 110 via the lens mount 202 and the camera mount 122, the camera control unit 117 and the lens control unit 209 are electrically connected to each other.

The object images including the right-eye image formed via the right-eye optical system 201R and the left-eye image formed via the left-eye optical system 201L are formed on the image sensor 111 in parallel. The image sensor 111 converts the captured object images (optical signals) into analog electric signals. The A/D converter 112 converts the analog electric signals output from the image sensor 111 into digital electric signals (image signals). The image processing unit 113 performs various image processing for the digital electric signals output from the A/D converter 112.

The display unit 114 displays various information. The display unit 114 includes, for example, an electronic viewfinder or a liquid crystal panel. The operation unit 115 has a function as a user interface for the user to give an instruction to the camera system 100. In the case where the display unit 114 has a touch panel, the touch panel also constitutes the operation unit 115.

The memory 116 includes, for example, a ROM, a RAM, and an HDD, and stores various data and programs such as image data that has been processed by the image processing unit 113.

The camera control unit 117 includes, for example, a CPU, and integrally controls the entire camera system 100.

Figure 2:
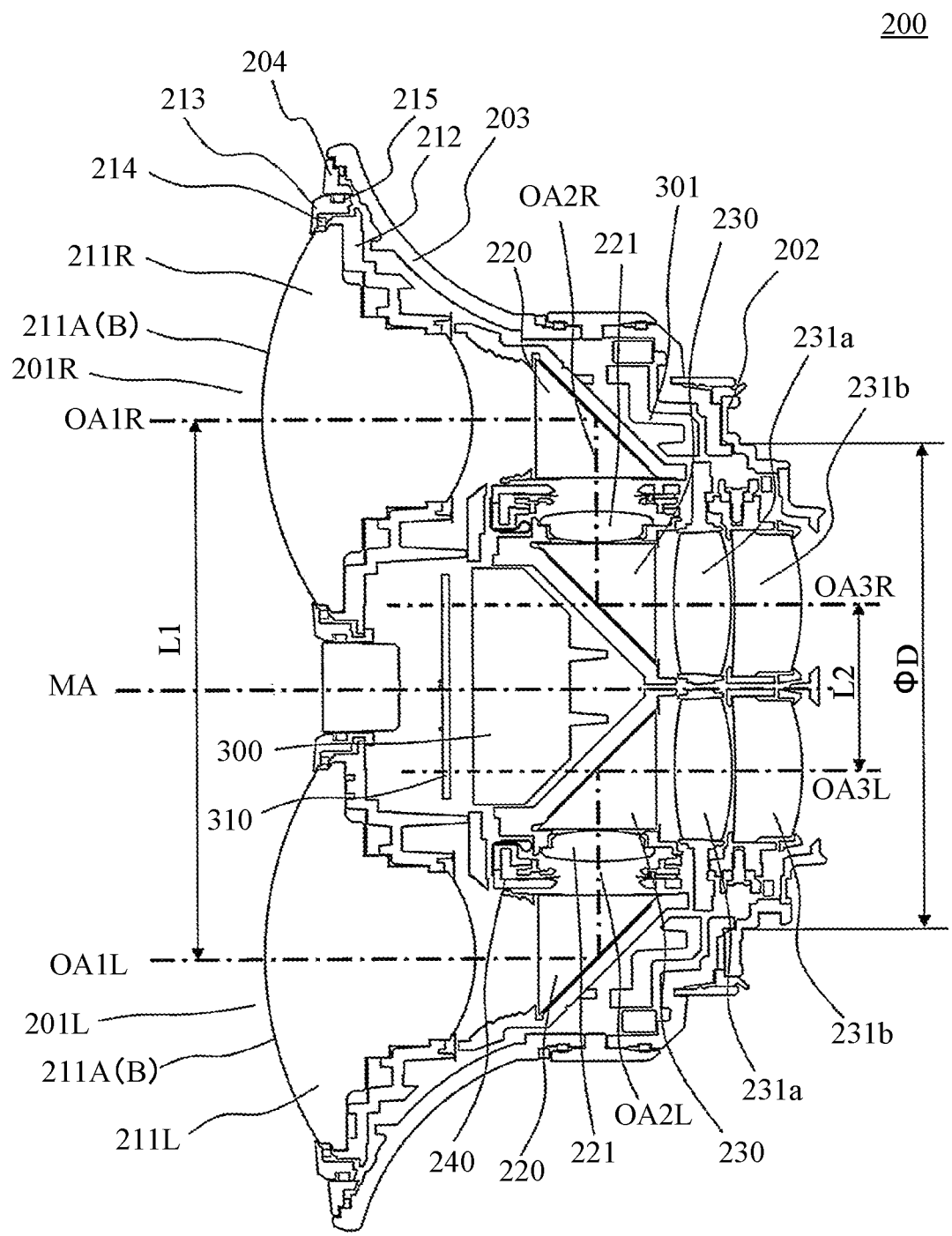
FIG. 2 is a sectional view of a lens apparatus.
Figure 3:
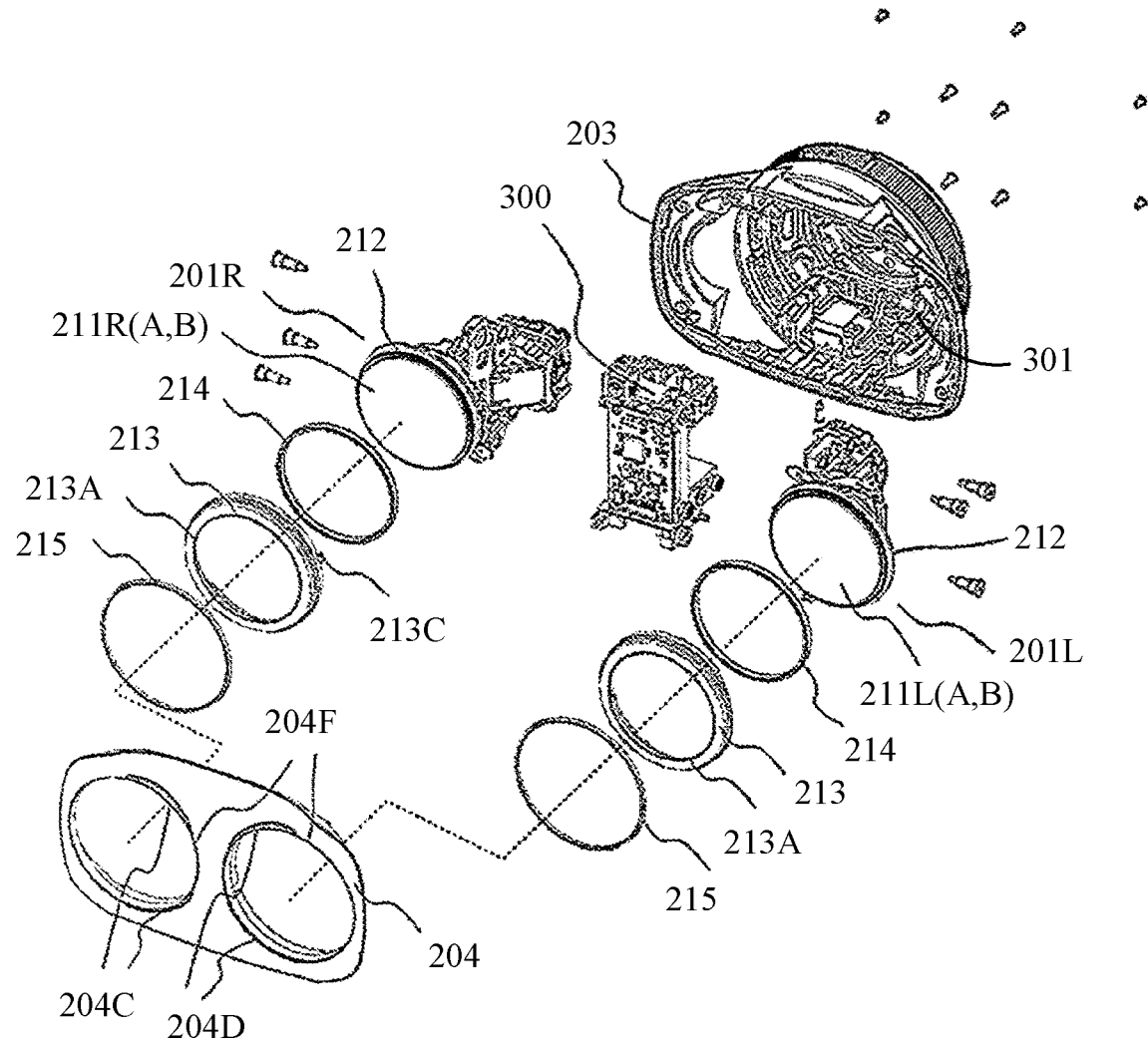
FIG. 3 is an exploded perspective view of the lens apparatus viewed from an object side.
Figure 4:
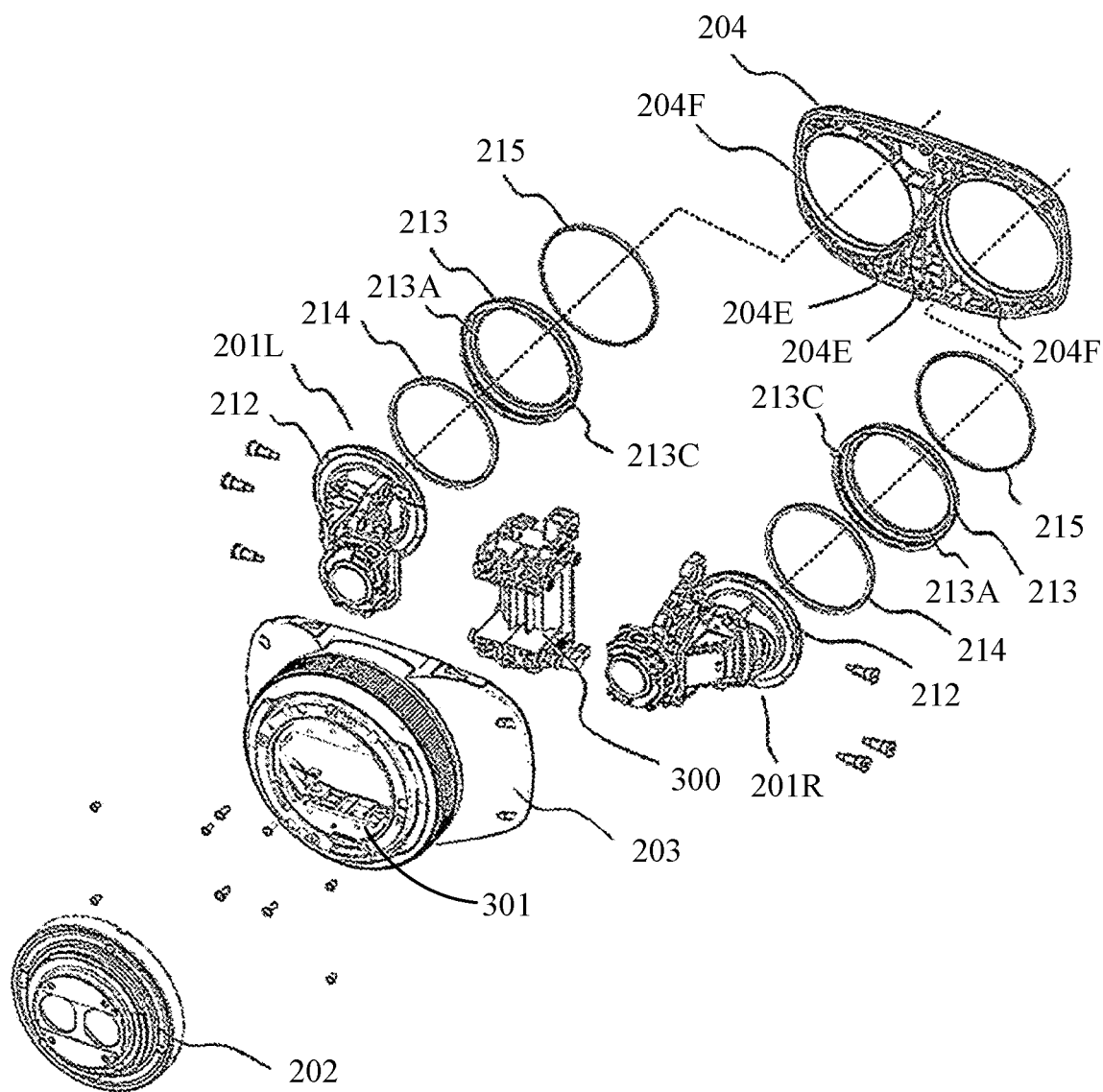
FIG. 4 is an exploded perspective view of the lens apparatus viewed from an imaging plane side.

FIG. 2 is a sectional view of the lens apparatus 200. FIG. 3 is an exploded perspective view of the lens apparatus 200 viewed from the object side. FIG. 4 is an exploded perspective view of the lens apparatus 200 viewed from the imaging plane side.

In the following description, a description of the right-eye optical system 201R will be given R at the end of the reference numeral, and a description of the left-eye optical system 201L will be given L at the end of the reference numeral. In the description common to both the right-eye optical system 201R and the left-eye optical system 201L, neither R nor L will be added to the end of the reference numeral. Each of the right-eye optical system 201R and the left-eye optical system 201L can capture an image at an angle of view higher than 180 degrees. Each optical system is a bending optical system having two reflective surfaces. In each optical system, a first optical axis OA1, a second optical axis OA2 approximately orthogonal to the first optical axis OA1, and a third optical axis OA3 parallel to the first optical axis OA1 are set in this order from the object side. Each optical system includes a first lens 211 having a convex lens surface 211A on the object side disposed on the first optical axis OA1, a second lens 221 disposed on the second optical axis OA2, and third lenses 231a and 231b disposed on the third optical axis OA3. Each optical system has a first prism (first reflective surface) 220 that bends a light beam on the first optical axis OA1 and guides it to the second optical axis OA2, and a second prism (first reflective surface) 230 that bends the light beam on the second optical axis OA2 and guides it to the third optical axis OA3. In the following description, the optical axis direction indicates a direction parallel to the first optical axis OA1, which is a direction extending toward the object side and the imaging plane side.

Each optical system is fixed to a lens top base 300 by tightening screws or the like. The lens top base 300 is fixed to the lens bottom base 301 by tightening screws or the like. The lens top base 300 and the lens bottom base 301 function a base member where the right-eye optical system 201R, the left-eye optical system 201L, and a circuit board 310 are attached. The right-eye optical system 201R, the left-eye optical system 201L, and the circuit board 310 can move integrally with the base member in a first optical direction relative to the lens mount 202. The lens bottom base 301 is held movably in the optical axis direction while it is restricted from moving in a rotation direction by an unillustrated linear movement structure. Thereby, since each optical system is integrally movable in the optical axis direction, the right-eye optical system 201R and the left-eye optical system 201L can adjust their focus positions at the same time.

Figure 5:
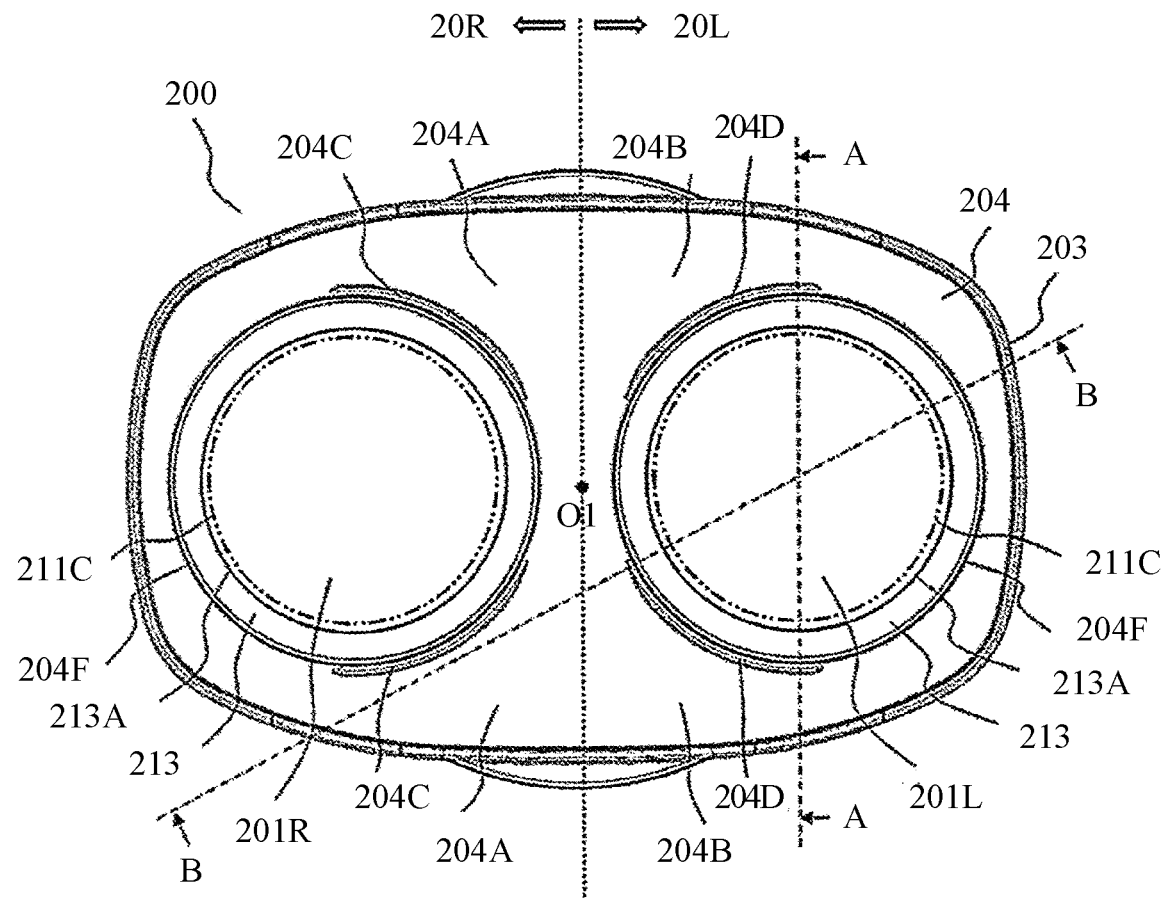
FIG. 5 is a front view of the lens apparatus.
Figure 6:
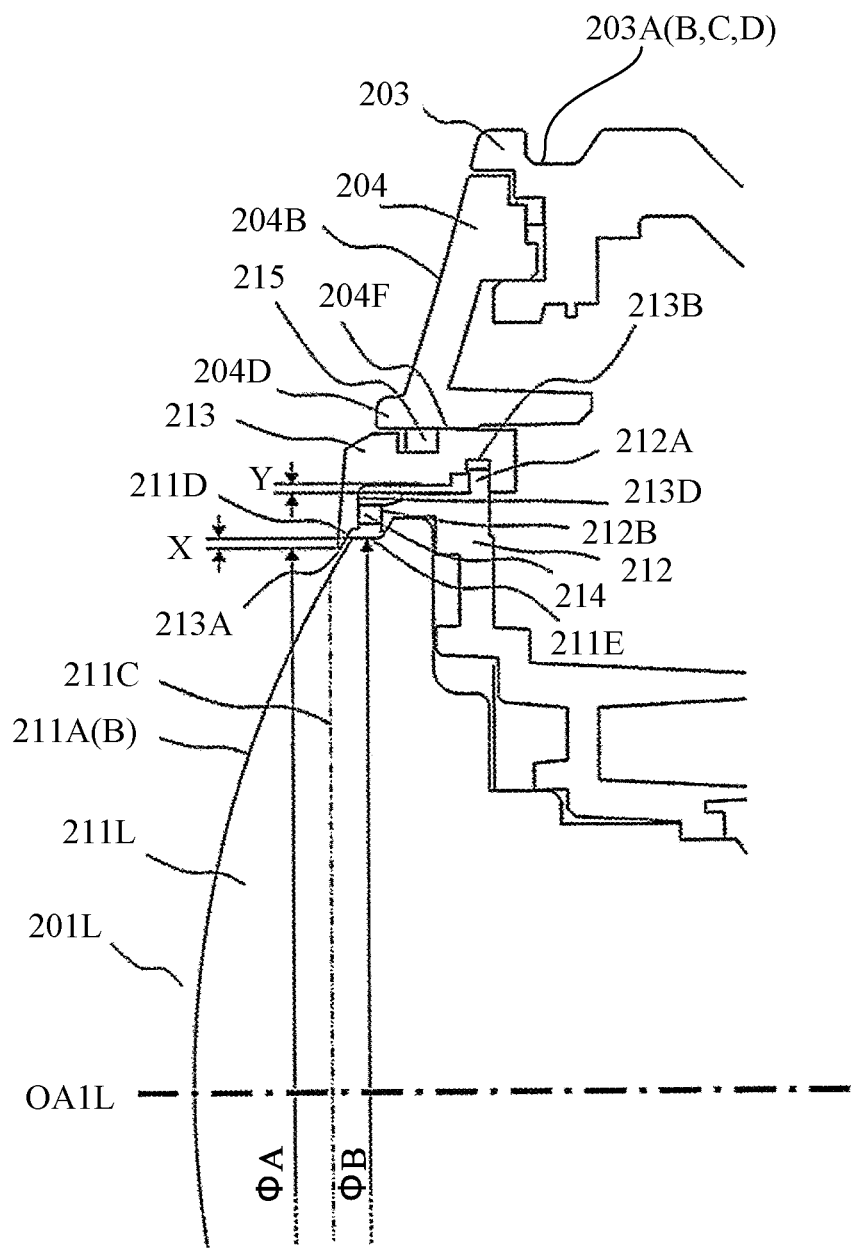
FIG. 6 is a sectional view taken along a line A-A in FIG. 5.
Figure 7:
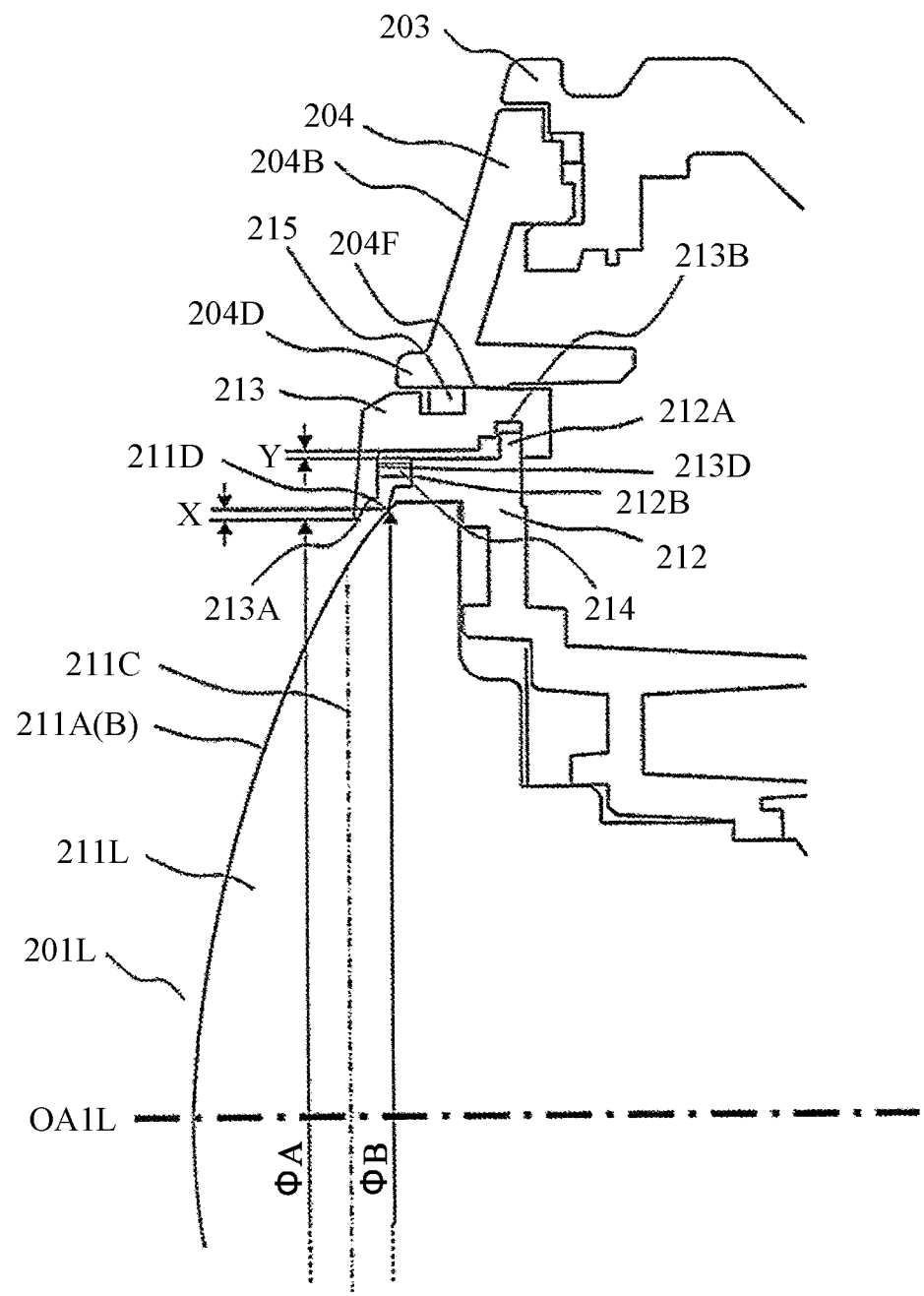
FIG. 7 illustrates a variation of the lens apparatus.
Figure 8:
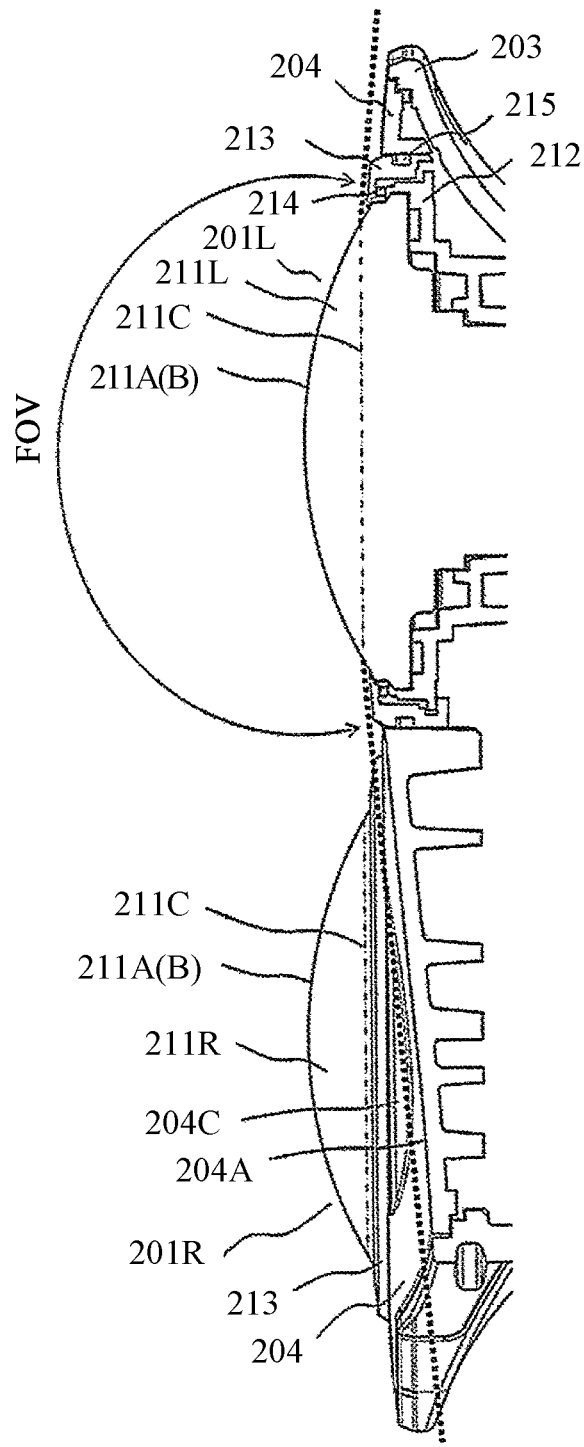
FIG. 8 is a sectional view taken along a line B-B of FIG. 5.

FIG. 5 is a front view of the lens apparatus 200. FIG. 6 is a sectional view taken along a line A-A in FIG. 5, illustrating the structure of the first lens 211 and its periphery. FIG. 7 illustrates a variation of the lens apparatus 200. FIG. 8 is a sectional view taken along a line B-B in FIG. 5, illustrating the structure of the first lens 211 of the lens apparatus 200 and its periphery.

The lens apparatus 200 includes an exterior cover member 203 and a front-surface exterior member (exterior member) 204. The exterior cover member 203 houses the right-eye optical system 201R and the left-eye optical system 201L. The front-surface exterior member 204 is screwed and fixed to the exterior cover member 203, and the front-surface exterior member 204 and the exterior cover member 203 can house the front side of the lens apparatus 200 so as to cover it.

The front-surface exterior member 204 has openings (second openings) 204F into which the first lens (first lens) 211R of the right-eye optical system 201R and the first lens (second lens) 211L of the left-eye optical system 201L are inserted. The front-surface exterior member 204 has a shape that does not shield effective light beams of the right-eye optical system 201R and the left-eye optical system 201L each having an effective angle of view FOV higher than 180 degrees. Lens surfaces 211A on the object side of the first lenses 211R and 211L are incident surfaces of the effective light beams on the object side. When an effective incident surface 211B is set to the inside of an effective-incident-surface outer-diameter 211C of the lens surface 211A, a light beam having an angle of view of 180 degrees extends horizontally in a direction approximately orthogonal to the optical axis from the effective incident surface 211B. A light beam having an angle of view higher than 180 degrees is located on the imaging plane side of the effective incident surface 211B, and extends toward the imaging plane side as a position becomes farther from the first lens 211. Thus, the front-surface exterior member 204 and the cover member 213 are disposed on the imaging plane side of the effective incident surface 211B because they do not shield the light beam having the angle of view higher than 180 degrees.

Now, as illustrated in FIG. 5, assume that a right-eye area 20R is an area located on the right-eye optical system 201R side and a left-eye area 20L is an area located on the left-eye optical system 201L side with respect to a center point O between the right-eye optical system 201R and the left-eye optical system 201L. Then, the front-surface exterior member 204 has an object-side surface 204A in the right-eye area 20R, which approaches the imaging plane as a position is separated from the first lens 211L of the left-eye optical system 201L so as not to shield the outermost effective light beam (thick dotted line portion in FIG. 8) of the left-eye optical system 201L. The front-surface exterior member 204 has an object-side surface 204B in the left-eye area 20L, which approaches the imaging plane as a position is separated from the first lens 211R of the right-eye optical system 201R so as not to shield the outermost effective light beam of the right-eye optical system 201R. However, the first lens 211L and its periphery viewed from the right-eye optical system 201R and the first lens 211R and its periphery viewed from the left-eye optical system 201L also have areas that shield part of mutual effective light beams.

The front-surface exterior member 204 has wall portions 204C and 204D protruding toward the object side from the object-side surfaces 204A and 204B in order to form the openings 204F. The wall portion 204C has an arc shape approximately coaxial with the first lens 211R of the right-eye optical system 201R and does not shield the effective light beam of the right-eye optical system 201R, but shields part of the effective light beam of the left-eye optical system 201L. The wall portion 204D has an arc shape approximately coaxial with the first lens 211L of the left-eye optical system 201L and does not shield the effective light beam of the left-eye optical system 201L, but shields part of the effective light beam of the right-eye optical system 201R.

As illustrated in FIG. 6, the lens apparatus 200 includes a first lens holder 212 and a cover member 213. The first lens holder 212 holds the first lenses 211R and 211L. The cover member 213 covers the outer circumference portion of the lens surfaces 211A on the object side of the first lenses 211R and 211L, and has openings (first openings) 213A into which the first lenses 211R and 211L are inserted. The openings 213A are formed so as to expose the first lenses 211R and 211L when viewed from the optical axis direction.

There is a boundary 211D with the lens surface 211A on the outer circumference side of the effective-incident-surface outer-diameter 211C of the first lens 211. The boundary 211D is a boundary between the lens surface 211A and other surfaces or members. For example, the boundary 211D may be a boundary between the lens surface 211A and a side surface 211E of the first lens 211, or as illustrated in FIG. 7, a boundary between the lens surface 211A and an inner diameter tip portion having a caulking claw shape for caulking the first lenses 211R and 211L.

The cover member 213 covers the boundary 211D. That is, the inner diameter of the opening 213A of the cover member 213 is smaller than the diameter of the boundary 211D. Where $\Phi A$ is the inner diameter of the opening 213A and $\Phi B$ is the diameter of the boundary 211D, an overlap amount X on one side is expressed by the following expression (1).

$$X = (\Phi B - \Phi A)/2 \tag{1}$$

The appearance quality can be improved by covering the boundary 211D.

A groove portion 213B is formed in part of the inner circumference of the cover member 213. A convex portion 212A extending toward the outer circumference side is formed on part of the outer circumference of the first lens holder 212. The groove portion 213B and the convex portion 212A are assembled when they are located at positions where they do not overlap each other when viewed from the optical axis direction, and the convex portion 212A is inserted into the groove portion 213B by rotating the cover member 213. Thereby, the cover member 213 is positioned with the first lens holder 212 in the optical axis direction. The first lens holder 212 may be provided with a groove portion, and the cover member 213 may be provided with a convex portion.

A predetermined gap (first gap) Y is formed in a (diameter) direction orthogonal to the optical axis direction between the first lens holder 212 and the cover member 213. Since the predetermined gap Y is smaller than the overlap amount X of the cover member 213, the cover member 213 can cover the boundary 211D even in a case where the first lens holder 212 or the cover member 213 moves by the predetermined gap Y.

The cover member 213 is positioned with the first lens holder 212 in the optical axis direction and thus is integrally movable with the first lens holder 212 in the optical axis direction. The outer diameter of the cover member 213 is engaged with the inner diameter of the opening 204F of the front-surface exterior member 204. The gap (second gap) in the direction orthogonal to the optical axis direction formed between the front-surface exterior member 204 and the cover member 213 by this engagement is very small and smaller than the predetermined gap Y.

The cover member 213 includes a rotation restricting key (projection) 213C, and the front-surface exterior member 204 includes a rotation restricting groove (groove portion) 204E corresponding to the rotation restricting key 213C. Thereby, when the front-surface exterior member 204 is incorporated, the rotation restricting key 213C is inserted into the rotation restricting groove 204E, and the cover member 213 is restricted from rotating. This structure can prevent the cover member 213 from rotating and coming off from the first lens holder 212. The cover member 213 may be provided with the rotation restricting groove, and the front-surface exterior member 204 may be provided with the rotation restricting key. That is, one of the cover member 213 and the front-surface exterior member 204 may include the rotation restricting key and the other may include the rotation restricting groove.

An optical-axis-direction (OAD) sealing member 214 is a drip-proof and dust-proof member, is disposed between a surface (first surface) 213D on the imaging plane side of the cover member 213 and a surface (second surface) 212B on the object side facing the surface 213D of the first lens holder 212, and seals a space between the surfaces 213D and 212B. The surfaces 213D and 212B may be formed on the entire circumference but may be partially formed. Since the OAD sealing member 214 is sandwiched in the optical axis direction, the cover member 213 and the first lens holder 212 are biased in the optical axis direction, and unsteadiness (or backlash) in the optical axis direction can be reduced.

In order to maintain the predetermined gap Y, the OAD sealing member 214 is disposed with a clearance (gap) larger than the predetermined gap Y with the cover member 213 and the first lens holder 212 in the direction orthogonal to the optical axis direction. The OAD sealing member 214 is made of an elastically deformable material, such as rubber or sponge, and can absorb the predetermined gap Y.

A radial seal member 215 is a drip-proof and dust-proof member and is disposed while sandwiched between the cover member 213 and the opening 204F in the direction orthogonal to the optical axis direction. The radial seal member 215 on the right-eye optical system 201R side is disposed at a position that shields the effective light beam of the left-eye optical system 201L, and the radial seal member 215 on the left-eye optical system 201L side is disposed at a position that shields the effective light beam of the right-eye optical system 201R.

The above-described structure can provide the lens apparatus 200 capable of maintaining the appearance quality, achieving both the dust-proof and drip-proof performance and the optical performance, and performing stereoscopic imaging at an angle of view higher than 180 degrees. Since the first lens holder 212 is not directly engaged with the opening 204F in the front-surface exterior member 204, even if the position of the first lens holder 212 is shifted by the influence of manufacturing errors or the like, the position needs no calibration. Therefore, the optical performance and the relative error between the right-eye optical system 201R and the left-eye optical system 201L do not change even if the front-surface exterior member 204 is incorporated.

Figure 9:
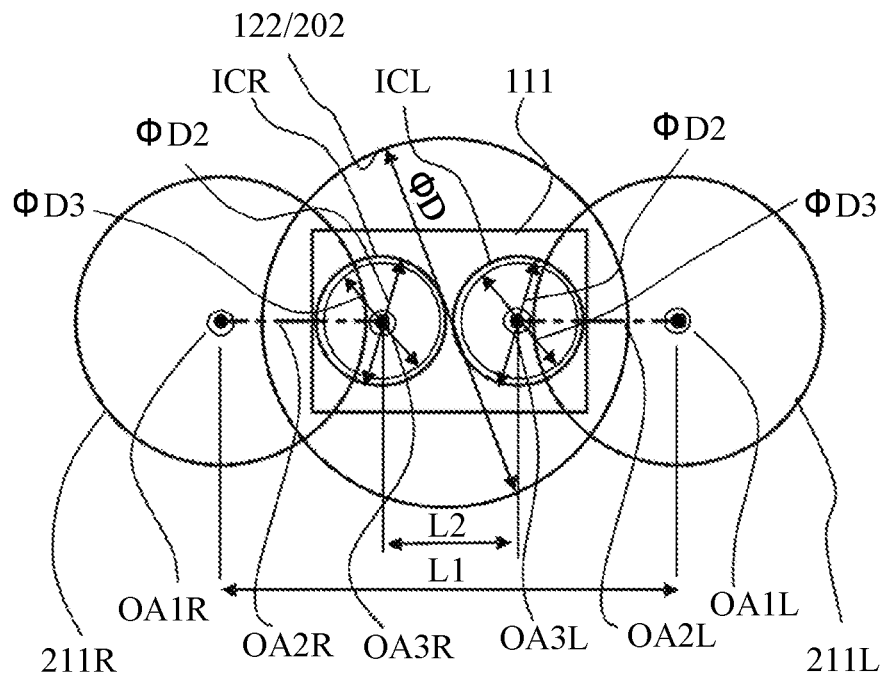
FIG. 9 illustrates a positional relationship between each optical axis and an image circle on an image sensor.

FIG. 9 illustrates a positional relationship between each optical axis of the lens apparatus 200 and the image circles on the image sensor 111.

A right-eye image circle ICR with an effective angle of view formed by the right-eye optical system 201R and a left-eye image circle ICL with an effective angle of view formed by the left-eye optical system 201L are imaged in parallel on the image sensor 111. A diameter ΦD2 of the image circle and a spaced distance between the image circles may be set so that the image circles do not overlap each other. For example, the center of the right-eye image circle ICR may be set to an approximate center of a right area that is made by dividing a light-receiving range of the image sensor 111 into left and right halves at the center, and the center of the left-eye image circle ICL may be set to an approximate center of the left area.

Each optical system is a wide-angle fisheye lens. In this embodiment, each optical system is a circumferential (all-around) fisheye lens, and the image formed on the imaging plane is a circular image reflecting a range of an angle of view higher than 180 degrees, and two circular images are formed on the left and right sides as illustrated in FIG. 9. The longer the distance (baseline length) L1 between the first optical axis OA1R of the right-eye optical system 201R and the first optical axis OA1L of the left-eye optical system 201L is, the more significant the stereoscopic effect becomes during viewing. For example, assume that the image sensor 111 has a size of 24 mm in length×36 mm in width, the diameter ΦD2 of the image circle is 17 mm, a distance L2 between the third optical axes OA3R and OA3L is 18 mm, and the length of the second optical axis is 21 mm. When each optical system is arranged so that the second optical axis extends in the horizontal direction, the baseline length L1 becomes 60 mm, which is almost equal to the eye width of an adult. The lenses disposed on the third optical axis can be placed inside the lens mount 202 by making the diameter (fitting diameter relative to the camera body 110) DD of the lens mount 202 shorter than the baseline length L1, and the distance L2 between the third optical axes shorter than the diameter DD of the lens mount 202. In VR viewing, it is said that an angle of view to obtain the stereoscopic effect is about 120 degrees, but a sense of discomfort remains when the field of view is 120 degrees and thus the angle of view is often widened to 180 degrees. Since the effective angle of view exceeds 180 degrees in this embodiment, the diameter ΦD2 of the image circle in this embodiment is larger than the diameter ΦD3 of the image circle in the range of the angle of view of 180 degrees.

Figure 10:
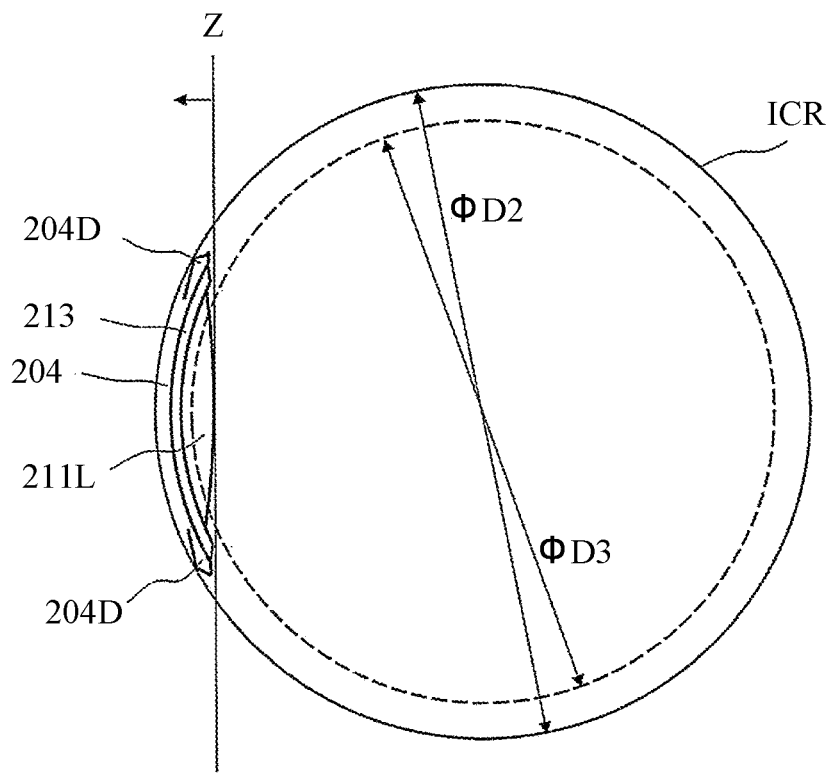
FIG. 10 illustrates reflection of a left-eye optical system in a case where an image is captured by a right-eye optical system.

FIG. 10 illustrates the reflection of the left-eye optical system 201L when the image is captured with the right-eye optical system 201R. The wall portion 204D of the front-surface exterior member 204 is imaged inside the diameter ΦD2 of the image circle, which is the effective angle of view, but is not imaged at an angle of view of 180 degrees, and is imaged outside the diameter ΦD3 of the image circle in the range of the angle of view of 180 degrees. Therefore, VR viewing is not affected in the range of the angle of view of 180 degrees. For example, within the effective angle of view of the right-eye optical system 201R, there are the first lens 211L of the left-eye optical system 201L in the left-eye area 20L, the cover member 213, and the wall portion 204D of the front-surface exterior member 204, which are imaged in the actual effective imaging range as illustrated in FIG. 10. Only the first lens 211L is imaged within the image circle at the angle of view of 180 degrees (inside the diameter ΦD3), but the cover member 213 and the wall portion 204D are located outside the image circle at the angle of view of 180 degrees. The reflection of the wall portion 204D is imaged outside (on the left side illustrated in FIG. 10) even when viewed in the horizontal direction from the vertex portion of the first lens 211L. In the case of image processing or image editing, if the outside of the vertex portion indicated by a straight line Z of the first lens 211L is cut, which is always reflected due to the specifications, the reflection of the wall portion 204D will not be affected. This is similarly applied to the reflection of the right-eye optical system 201R when an image is captured with the left-eye optical system 201L. As described above, although the wall portion 204D is located within the effective angle of view, it is located so as to have almost no influence on imaging in the actual VR application.

Figure 11:
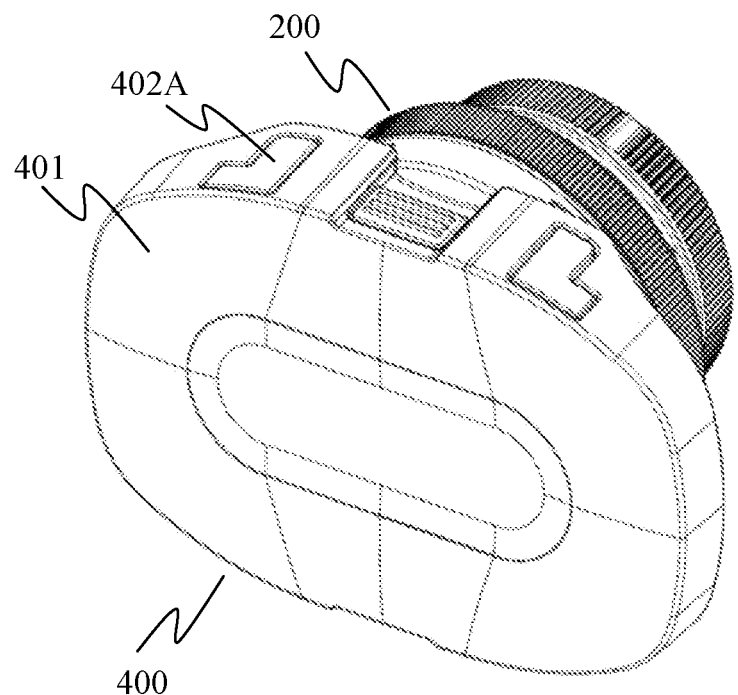
FIG. 11 is an external perspective view of a lens cap attached to the lens apparatus.
Figure 12:
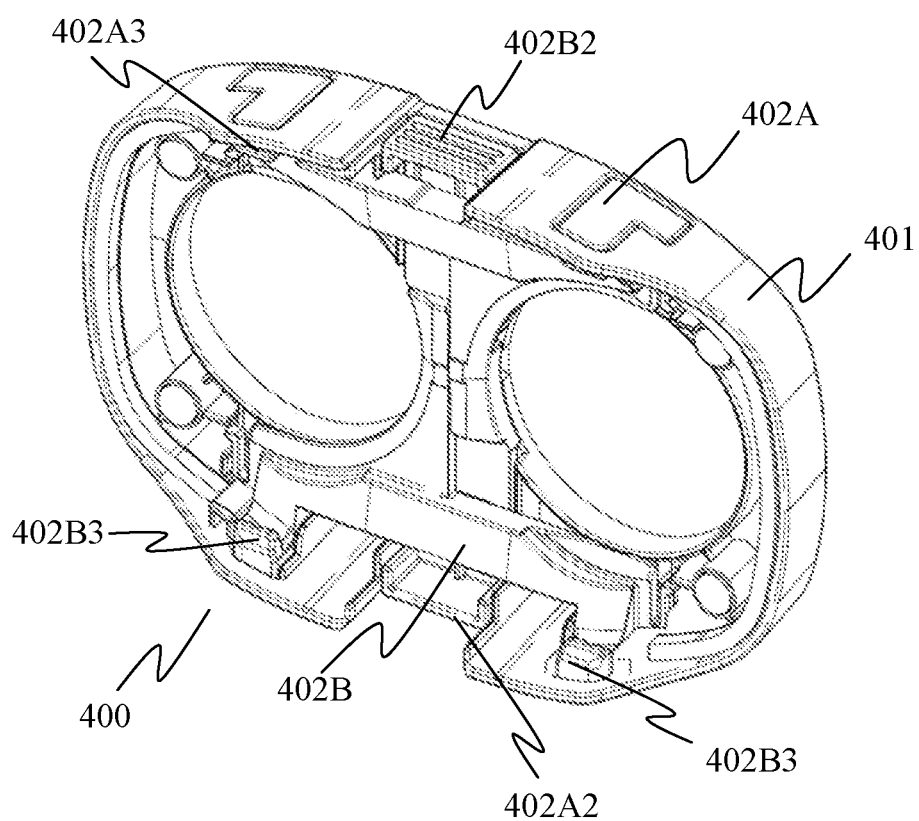
FIG. 12 is an external perspective view of the lens cap when attached to the lens apparatus.
Figure 13:
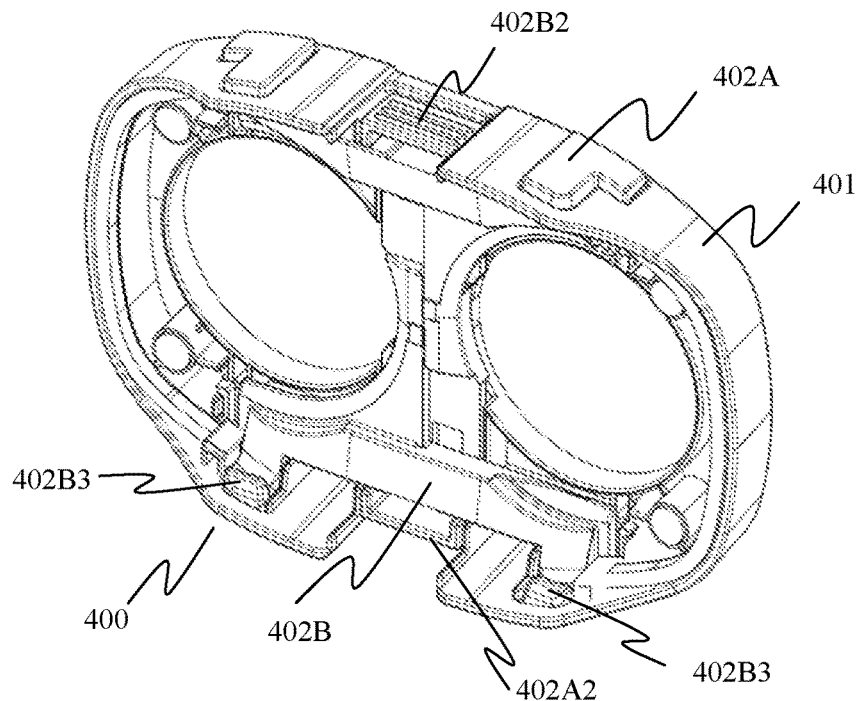
FIG. 13 is an external perspective view of the lens cap when detached from the lens apparatus.
Figure 14:
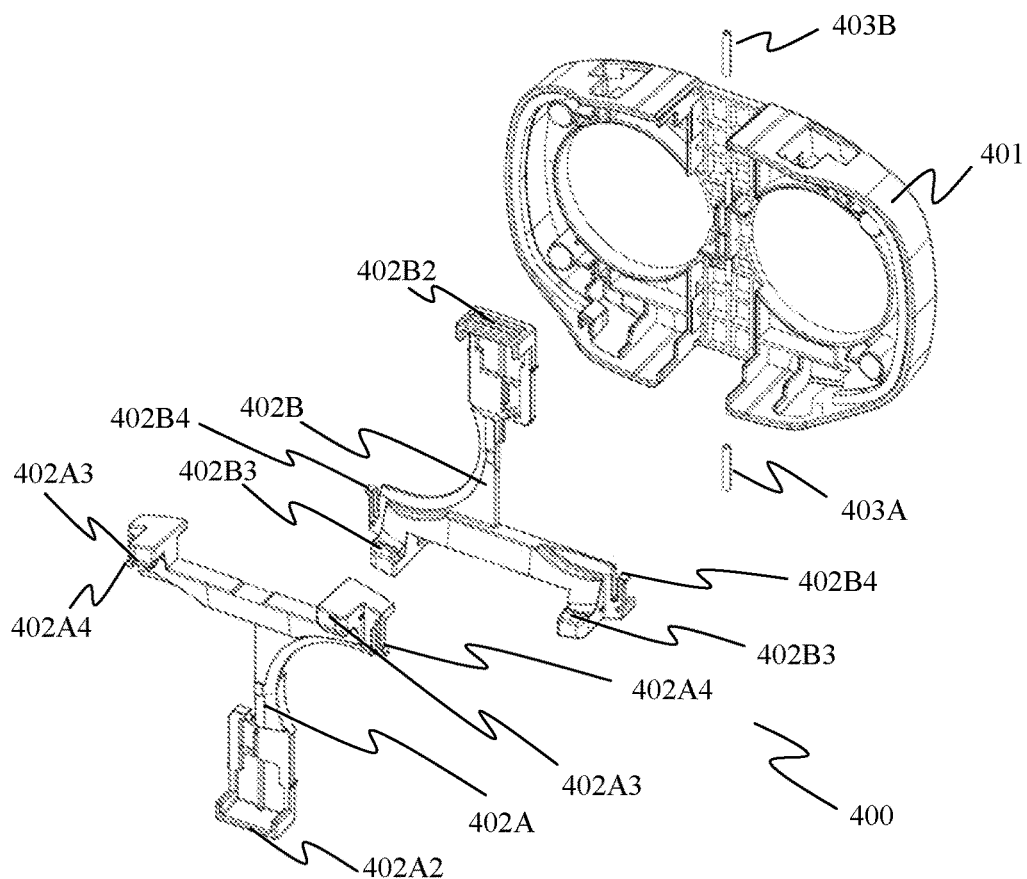
FIG. 14 is an exploded perspective view of the lens cap.

A structure of a lens cap 400 that is attachable to and detachable from the lens apparatus 200 with one action will be described below. FIG. 11 is an external perspective view of the lens cap 400 attached to the lens apparatus 200. FIG. 12 is an external perspective view of the lens cap 400 when attached to the lens apparatus 200 (not illustrated). FIG. 13 is an external perspective view of the lens cap 400 when detached from the lens apparatus 200 (not illustrated). FIG. 14 is an exploded perspective view of the lens cap 400.

The lens cap 400 includes a base 401, sliders (slider members) 402A and 402B, and springs 403A and 403B. The sliders 402A and 402B have the same shape, are connected in a phase rotated by 180 degrees, and are incorporated in the base 401. The slider 402A (402B) includes an operation unit 402A2 (402B2), a connection portion 402A3 (402B3) that fits the lens apparatus 200, and a stopper portion 402A4 (402B4) that abuts on the base 401. Further, the slider 402A (402B) includes a connecting portion arranged between the optical axis of the first lens 211R and the optical axis of the first lens 211L. Additionally, the slider 402A (402B) is urged to the side of the operation unit 402A2 (402B2) by the spring 403A (403B) incorporated in the base 401. The base 401 and the stopper portion 402A4 (402B4) are in contact with each other while the slider 402A (402B) is urged. By simultaneously pushing the operation units 402A2 and 402B2 toward the connection portions 402A3 and 402B3, the connection portions 402A3 and 402B3 are opened and closed, and the lens cap 400 can be attached to and detached from the lens apparatus 200. The lens cap 400 can be attached to and detached from the lens apparatus 200 by simply pressing one of the operation units.

Figure 15:
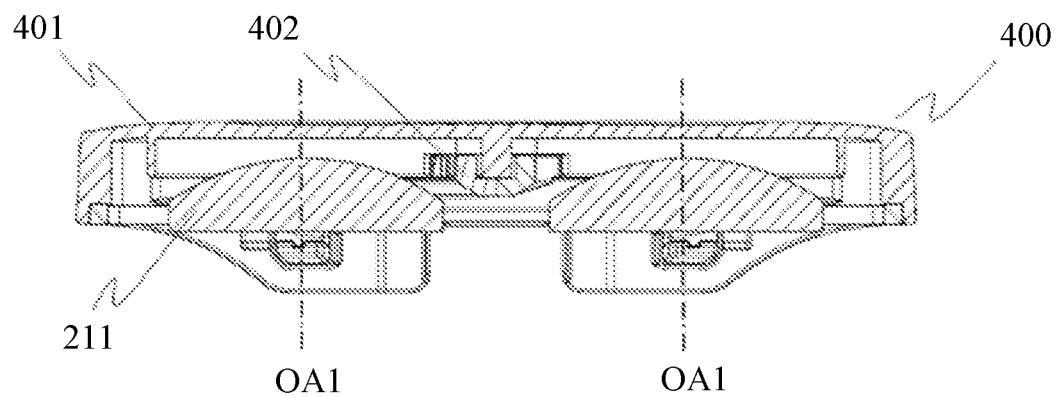
FIG. 15 is a sectional view of the lens cap and the first lens when the lens cap is attached.
Figure 16:
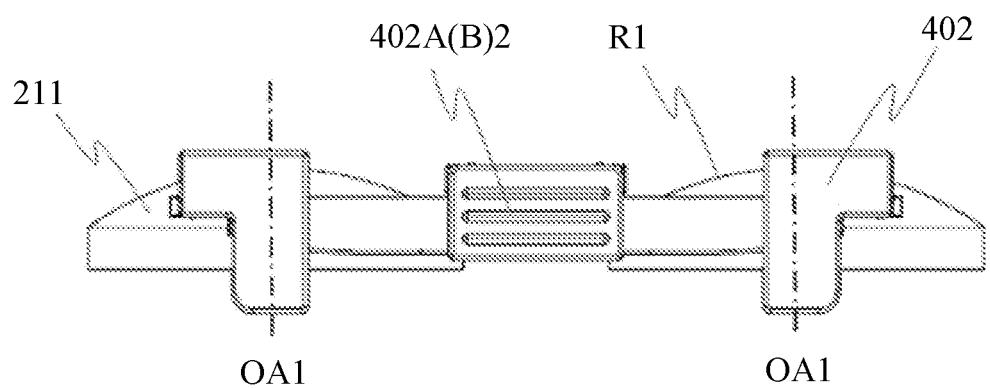
FIG. 16 is a side view of the sliders and the first lens when the lens cap is attached.
Figure 17:
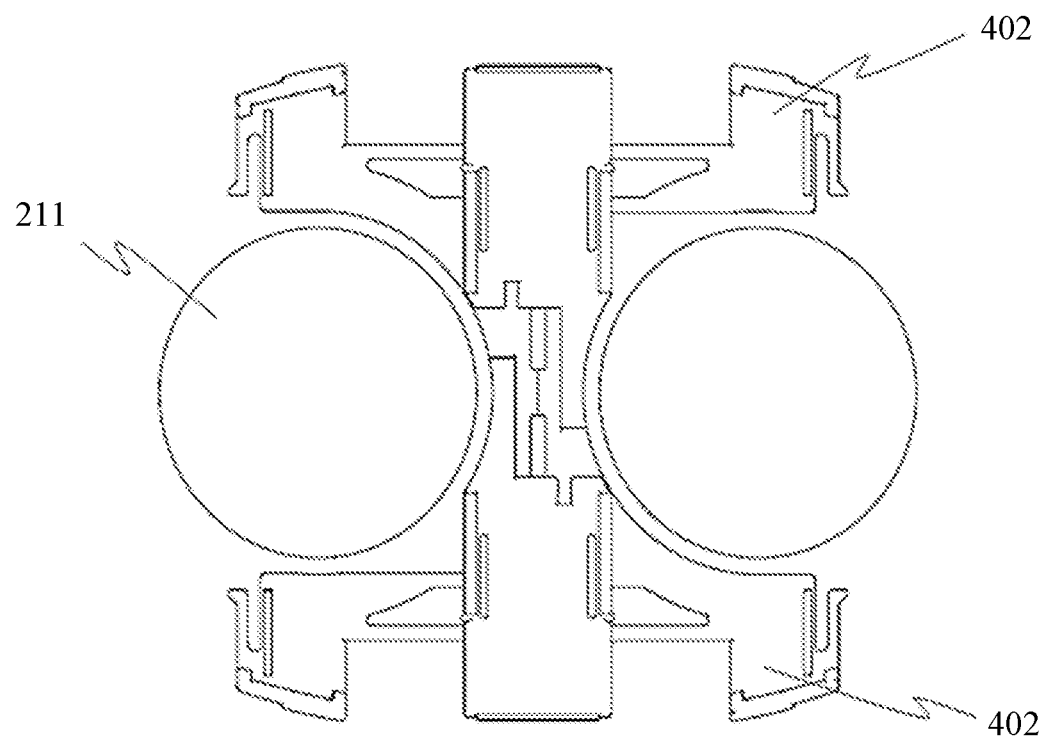
FIG. 17 is a top view of the sliders and the first lens when the lens cap is attached.

The configuration of the lens cap 400 and the first lens 211 when the lens cap 400 is attached will be described below. FIG. 15 is a sectional view of the lens cap 400 and the first lens 211 when the lens cap 400 is attached. FIG. 16 is a side view of the sliders 402A and 402B and the first lens 211 when the lens cap 400 is attached. FIG. 17 is a top view of the sliders 402A and 402B and the first lens 211 when the lens cap 400 is attached.

The sliders 402A and 402B are arranged between the first lenses 211R and 211L disposed on the first optical axis OA1, and the sliders 402A and 402B and the first lenses 211R and 211L are provided on the same plane orthogonal to the optical axis direction. As a result, the thickness in the optical axis direction can be reduced by the thickness of the slider 402. Further, the operation units 402A2 and 402B2 are arranged at the center between the first lenses 211R and 211L. This makes it possible to realize smooth operability.

Figure 18:
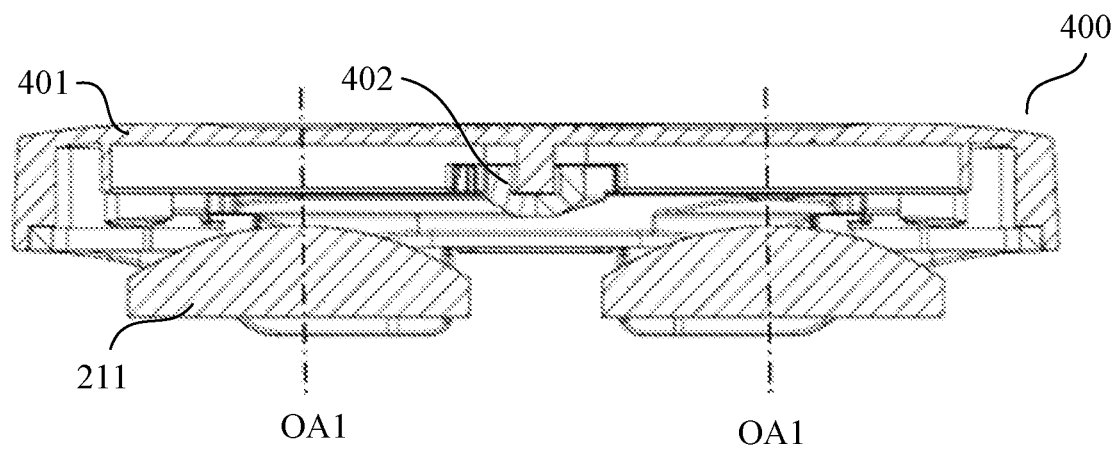
FIG. 18 is a sectional view of the lens cap and the first lens when the lens cap according to another example is attached.

FIG. 18 is a sectional view of the lens cap 400 and the first lens 211 when the lens cap 400 according to another example is attached.

The sliders 402A and 402B are arranged between the first lenses 211R and 211L disposed on the first optical axis OA1, and the sliders 402A and 402B and the first lenses 211R and 211R are not provided on the same plane orthogonal to the optical axis direction. As a result, the thickness of the sliders 402A and 402B becomes thicker, so that the weight becomes heavier as the lens apparatus 200 becomes larger, and even if the strength of the sliders 402A and 402B is insufficient due to a drop test or the like, the strength can be improved.

Figure 19:
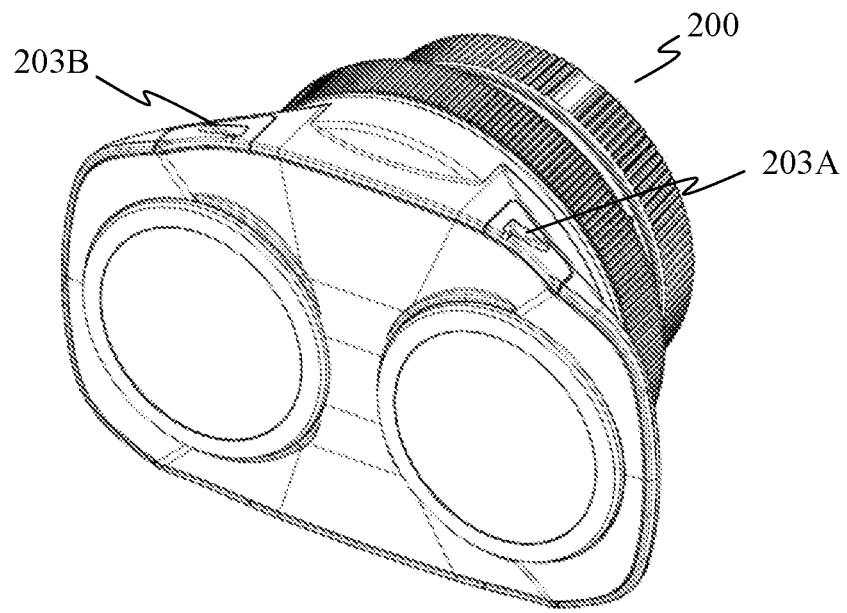
FIG. 19 is an external perspective view of the lens apparatus.
Figure 20:
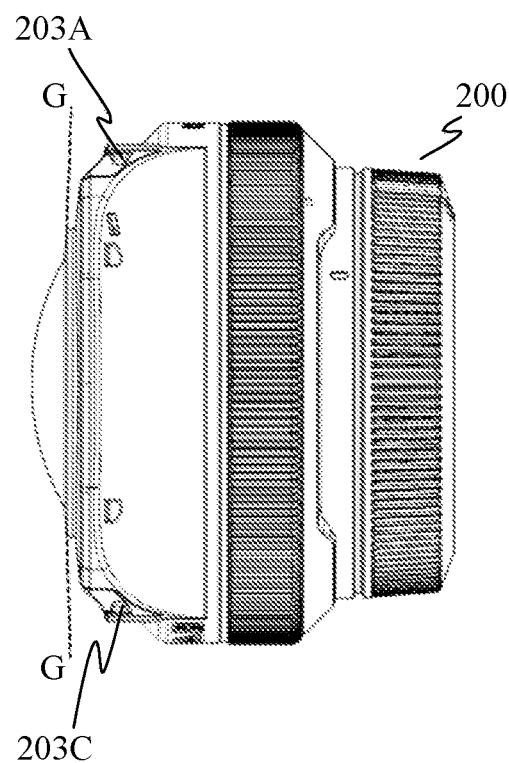
FIG. 20 is an external side view of the lens apparatus.
Figure 21:
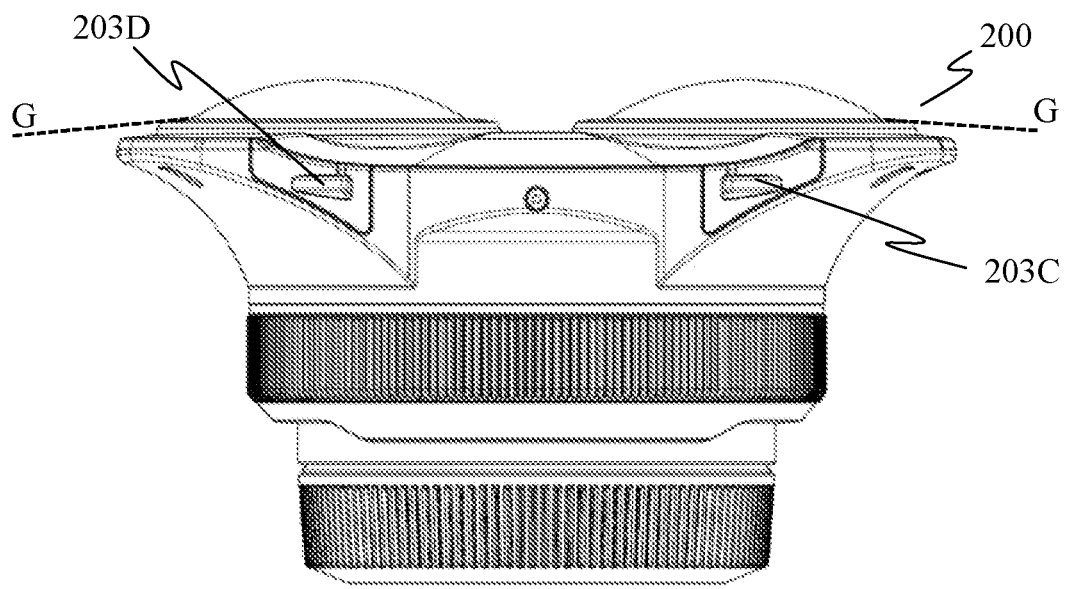
FIG. 21 is an external bottom view of the lens apparatus.

The arrangement of the connection portions 203A, 203B, 203C, and 203D provided in the lens apparatus 200 that fits with the connection portions 402A3 and 402B3 will be described below. FIGS. 19 to 21 are respectively an external perspective view, an external side view, and an external bottom view of the lens apparatus 200. The angle of view of the lens apparatus 200 is the range indicated by the dotted line G, and exceeds 180 degrees toward the object side. If a component or the like including a connection portion is provided on the object side from the range indicated by the dotted line G, it will be reflected in the image. Thus, the connection portions 203A, 203B, 203C, and 203D are provided outside the angle of view indicated by the dotted line G. In this embodiment, the connection portions 203A, 203B, 203C, and 203D are provided in the direction visible from the external direction, but the lens cap 400 may be fitted to the lens apparatus 200 in the direction invisible from the external direction, that is, from the inside. Even in that case, by arranging the connection portions 203A, 203B, 203C, and 203D outside the angle of view indicated by the dotted line G, it is possible to prevent the connection portion 203A, 203B, 203C, and 203D from being reflected in the image.

Figure 22:
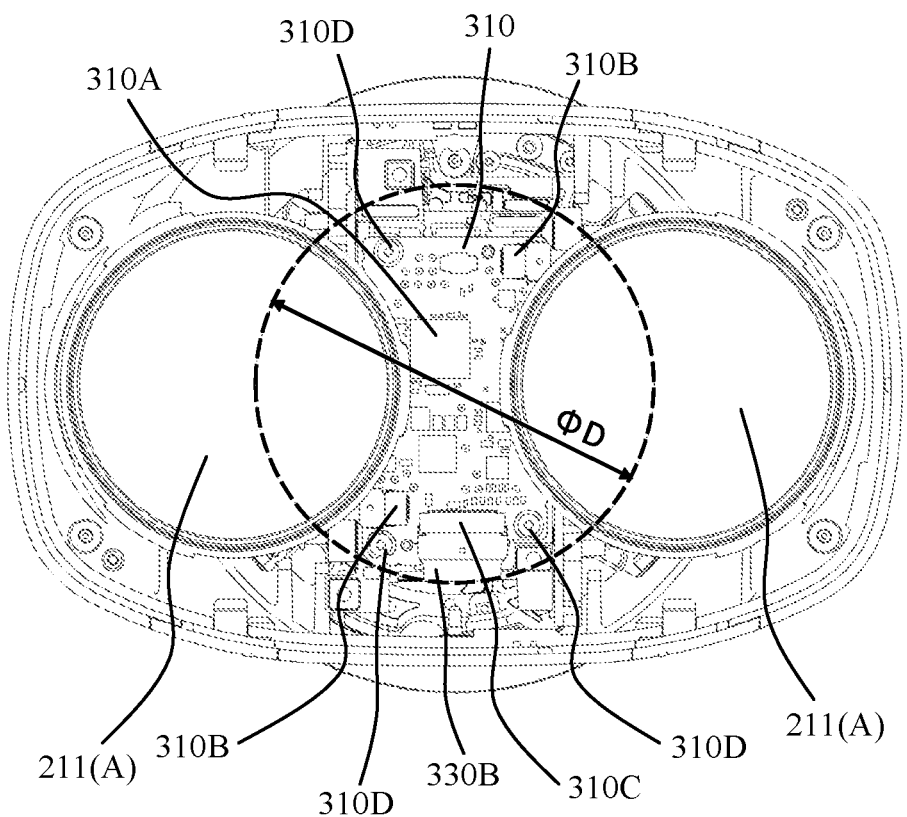
FIG. 22 is a front view of the lens apparatus in a state in which a front extender member and a cover are removed.

The lens system control unit 209 is arranged inside the interchangeable lens 200 as a circuit board 310 as illustrated in FIGS. 1 and 22. A diaphragm apparatus (electronic member) 240 is arranged in each of the right eye optical system 201R and the left eye optical system 201L as illustrated in FIG. 2, and electronically controlling a drive source 320 such as a stepping motor (see FIGS. 23A and 23B) can set the desired aperture diameter.

Figure 23A:
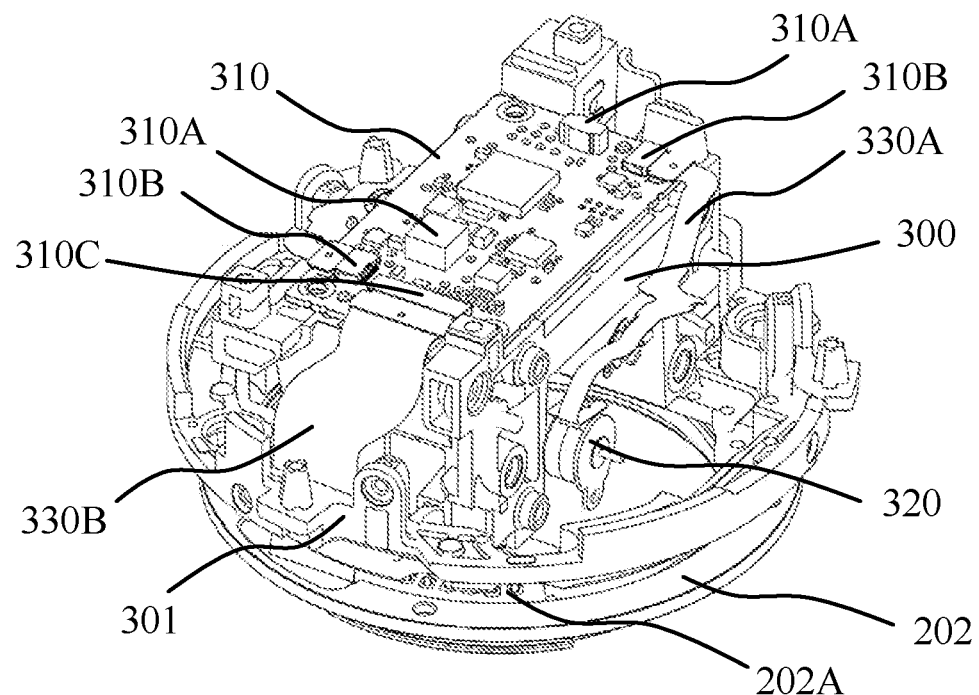
FIGS. 23A and 23B are perspective views of a main part of the lens apparatus.
Figure 23B:
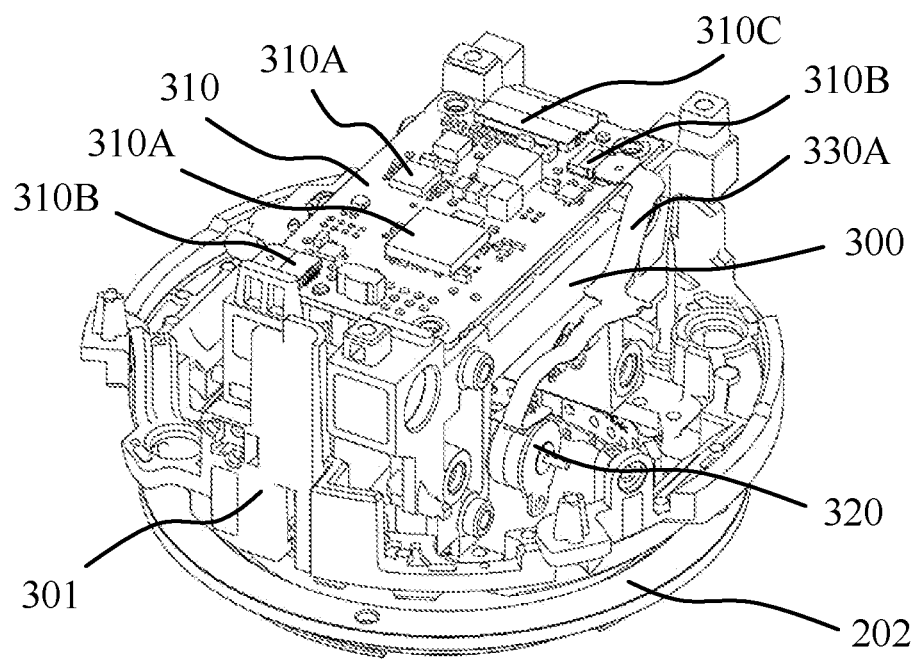

As illustrated in FIGS. 2 and 22, a circuit board 310 for electronically controlling the aperture device 240 is arranged on the lens top base 300. As illustrated in FIGS. 23A and 23B, the circuit board 310 includes a plurality of electric elements 310A for communication with the camera body 110 and control of electronic components, and is electrically connected by a wiring unit. Further, a flexible substrate (second flexible substrate) 330A is provided for communicating with the electronic component to be controlled. The flexible substrate 330A is electrically connected to the diaphragm apparatus 240 and the drive source 320 such as a stepping motor. The circuit board 310 is provided with a connector (second connector) 310B for electrically connecting the flexible board 330A. The connector 310B is arranged point-symmetrically around the axis of the lens mount 202.

Additionally, a flexible substrate (first flexible substrate) 330B is provided for communicating with the camera body 110. The flexible substrate 330B is electrically connected to an electrical contact portion (communication unit) 202A arranged on the lens mount 202 in order to communicate with the camera body 110. Further, a connector (first connector) 310C for electrically connecting the flexible board 330B is arranged on the circuit board 310. The flexible substrate 330B electrically connects the electric contact portion 202A and the connector 310C, and extends in a direction of a lens mount axis MA. When viewed from the direction of the lens mount axis MA, the connectors 310B and 310C are arranged not to overlap with the first lens 211 and the first lens holder 212 disposed closest to the object in each of the right eye optical system 201R and the left eye optical system 201L. With the above configuration, the circuit board 310 can communicate with the camera body 110 through the lens mount 202, and can control electronic components such as the aperture device 240 provided inside the interchangeable lens 200.

In this embodiment, the circuit board 310 electronically controls the aperture device 240, but if there is an object to be electronically driven, such as when the lens is driven for vibration isolation or autofocus, the circuit board 310 can play the role of electronic control.

The circuit board 310 is fixed to the lens top base 300 by tightening screws or the like. Further, the lens top base 300 and the lens bottom base 301 are a base member of a binocular optical system unit, and the right eye optical system 201R and the left eye optical system 201L can move forward and backward in the optical axis direction integrally with the base member.

As illustrated in FIG. 2, the circuit board 310 is positioned between the two first optical axes OA1R and OA1L of the right eye optical system 201R and the left eye optical system 201L (position sandwiched between the two first optical axes), and is arranged on the object side of the second optical axes OA2R and OA2L. Further, the circuit board 310 is arranged on the axis of the lens mount 202 (on the lens mount axis MA). Additionally, the substrate surface of the circuit board 310 (the surface on which the electric element 310A is arranged) is perpendicular to the lens mount axis MA.

Moreover, the circuit board 310 is arranged at a position overlapping the lens surface 211A on the object side of the first lens 211 arranged closer to the object than the circuit board 310 when viewed from the first optical axis direction or the direction of the lens mount axis MA. In addition, the circuit board 310 is arranged closer to the image plane side than the lens surface 211A, and is arranged at a position sandwiched between the side surfaces of the lens having a small diameter. In FIG. 2, although overlapping with the small diameter portion of the first lens 211, the circuit board 310 may be sandwiched by another lens arranged closer to the image plane side than the first lens 211. That is, the circuit board 310 is arranged at a position sandwiched between the side surfaces of the lens member arranged closer the image plane side than the lens surface 211A. Further, the circuit board 310 is arranged on an extension line of the third optical axis OA3. Additionally, the circuit board 310 is arranged in a region where the second prism 230, which is an optical member forming the second optical axis OA2, and the lens mount axis MA overlap each other when viewed from the direction of the lens mount axis MA.

Arranging the circuit board 310 at such a position can effectively utilize the space between the two optical systems created by securing the distance L1 between the first optical axes, which is an appropriate baseline length for VR stereoscopic viewing, and can make a space-efficient arrangement. It is also advantageous for miniaturization of the interchangeable lens 200.

Further, in the case of the interchangeable lens 200 in which two optical systems are imaged on one imaging sensor as in this embodiment, the third optical axis OA3 is inside the diameter of the lens mount 202, and projects to the outer diameter side of the main body of the interchangeable lens 200 by the second optical axis OA2 to secure the baseline length. In such a configuration, when trying to arrange a donut-shaped or C-shaped circuit board near the lens mount as in the conventional case, for example, the inclusion member such as the first prism 220, the second prism 230, and a holding frame for holding them, and the bottom base 301 may be affected. As a result, the degree of freedom in design is reduced and the interchangeable lens 200 becomes large. For example, in an attempt to arrange a donut-shaped or C-shaped circuit board near the lens mount as in the conventional case, it is conceivable to arrange the second optical axis OA2 closer to the object in order to secure space. However, if the second optical axis OA2 is arranged closer to the object, the overall length of the optical system increases, and the outer diameter of the lens itself also increases, which leads to an increase in the size of the interchangeable lens. On the contrary, arranging the second optical axis OA2 closer to the image plane side can shorten the total length of the lens and can reduce the diameter of the lens, which can contribute to the miniaturization of the interchangeable lens.

Further, as an efficiency improvement of the circuit board 310 itself, the shape of the board surface of the circuit board 310 is not a donut shape or a C-shaped shape as in the conventional case, but a substantially rectangular shape, so that the efficient arrangement and wiring of the electric element 310A in the circuit board 310 can be improved. Additionally, the substantially rectangular shape can improve the efficiency of punching by the press in the manufacturing process as compared with the donut shape and the C-shaped shape. Cost reduction can be achieved by increasing the number of sheets taken by the press.

FIG. 22 is a front view of the interchangeable lens 200 in a state in which the front extender member 204 and the cover 213 are removed when viewed from the object side in the direction of the lens mount axis MA. The circuit board 310 is fixed to the lens top base 300 at a fixing portion 310D by tightening screws or the like. The fixing method may be screw tightening or adhesion. The fixed portion 310D is arranged not to overlap with the first lens 211, which is disposed closer to the object than the circuit board 310, and the first lens holder 212 when viewed from the object side in the direction of the first optical axis OA1. Similarly, the connectors 310B and 310C are arranged not to overlap with the first lens 211 and the first lens holder 212. With such an arrangement, for example, the circuit board 310 can be incorporated in a state where only the front exterior 204 and the cover 213 are not assembled, and can be fixed or connected to a flexible board. Then, after fixing and connecting the circuit board 310, the front exterior 204 and the cover 213 can be assembled to complete the interchangeable lens 200. Even if the circuit board 310 needs to be replaced due to a defect of the circuit board 310, the circuit board 310 can be relatively quickly replaced.

Further, as described above, the circuit board 310 is arranged on the lens mount axis MA. Additionally, when viewed from the direction of the lens mount axis MA, it is desirable that at least a part of the electric element 310A provided on the circuit board 310 is arranged inside the diameter DD of the lens mount 202. Moreover, when viewed from a direction orthogonal to each of the distance direction (direction of the baseline length L1) between the two first optical axes OA1R and OA1L and the first optical axis direction, it is desirable that the circuit board 310 is arranged between the two first optical axes OA1R and OA1L. As a result, the interchangeable lens 200 can be further miniaturized. It is desirable for miniaturization that the fixing portion 310D for mounting the circuit board 310 is also arranged inside the diameter ΦD. However, depending on the fixing method and fixing location, the outside of the diameter DD may be preferable in terms of design. Accordingly, at least the electric element 310A is located inside the diameter DD, so that the configuration can be made more advantageous for miniaturization.

Figure 24:
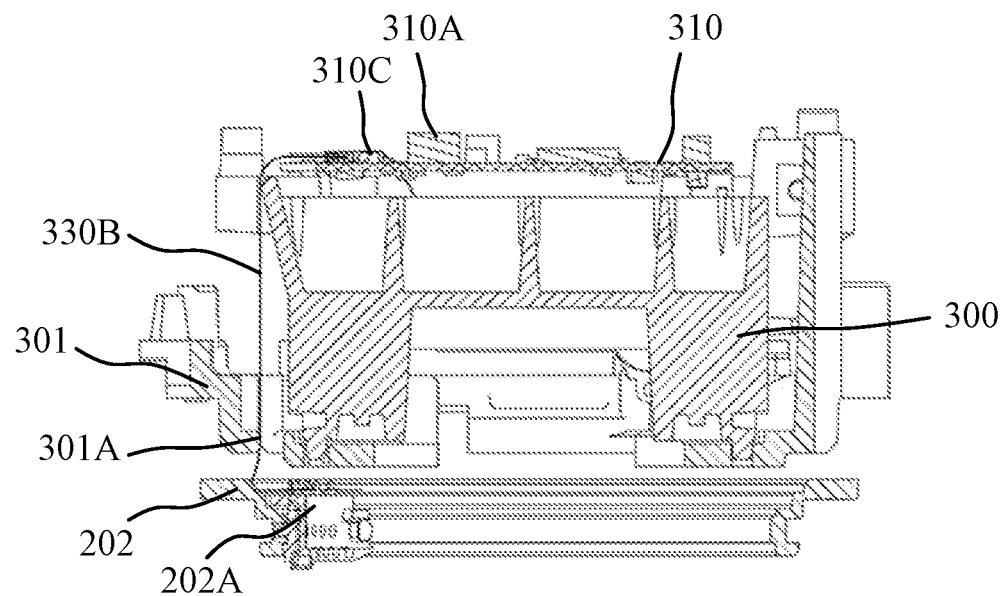
FIG. 24 is a sectional view illustrating a path of a flexible substrate.

FIGS. 23A and 23B are perspective views of a main part of the interchangeable lens 200 as viewed from two different directions. FIGS. 23A and 23B illustrates only the lens mount 202 and the circuit board 310, their peripheral components such as the flexible substrates 330A and 330B, the lens top base 300 and the lens bottom base 301 of the base member, and the like. FIG. 24 is a sectional view illustrating a path of the flexible substrate 330B.

The flexible board 330B is electrically connected to the electrical contact portion 202A of the lens mount 202 and the connector 310C of the circuit board 310, and can communicate with the camera body 110. The flexible substrate 330B extends in the direction of the lens mount axis MA. In this embodiment, the lens bottom base 301 is arranged as the base member in the space where the donut-shaped or C-shaped circuit board is arranged as in the conventional case. The lens bottom base 301 includes a mechanism for moving the optical system in the optical axis direction in the vicinity of the outer periphery thereof, and serves as a barrier when connecting the flexible substrate 330B from the lens mount 202 to the circuit board 310. In this embodiment, as illustrated in FIGS. 23A, 23B and 24, a through hole 301A is formed on the lens bottom base 301, and the flexible substrate 330B is configured to pass through the through hole 301A. With such a configuration, the connection between the lens mount 202 and the circuit board 310 can be connected in a relatively short distance.

Figure 25:
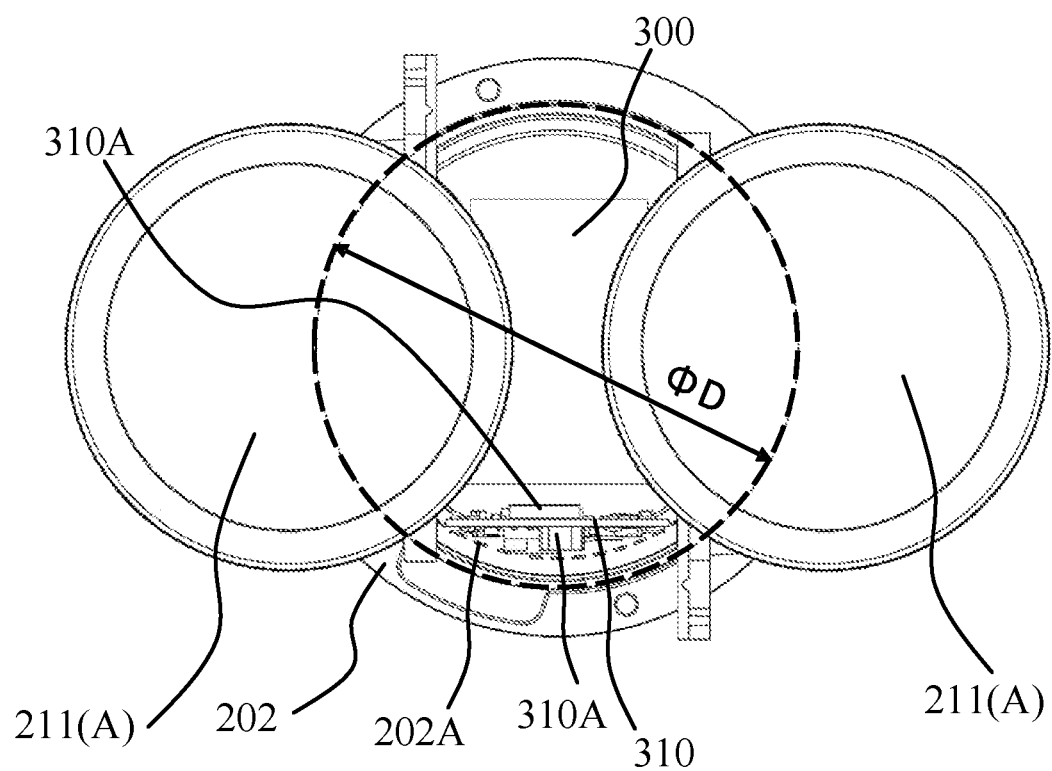
FIG. 25 is a front view of the lens apparatus as another example.
Figure 26:
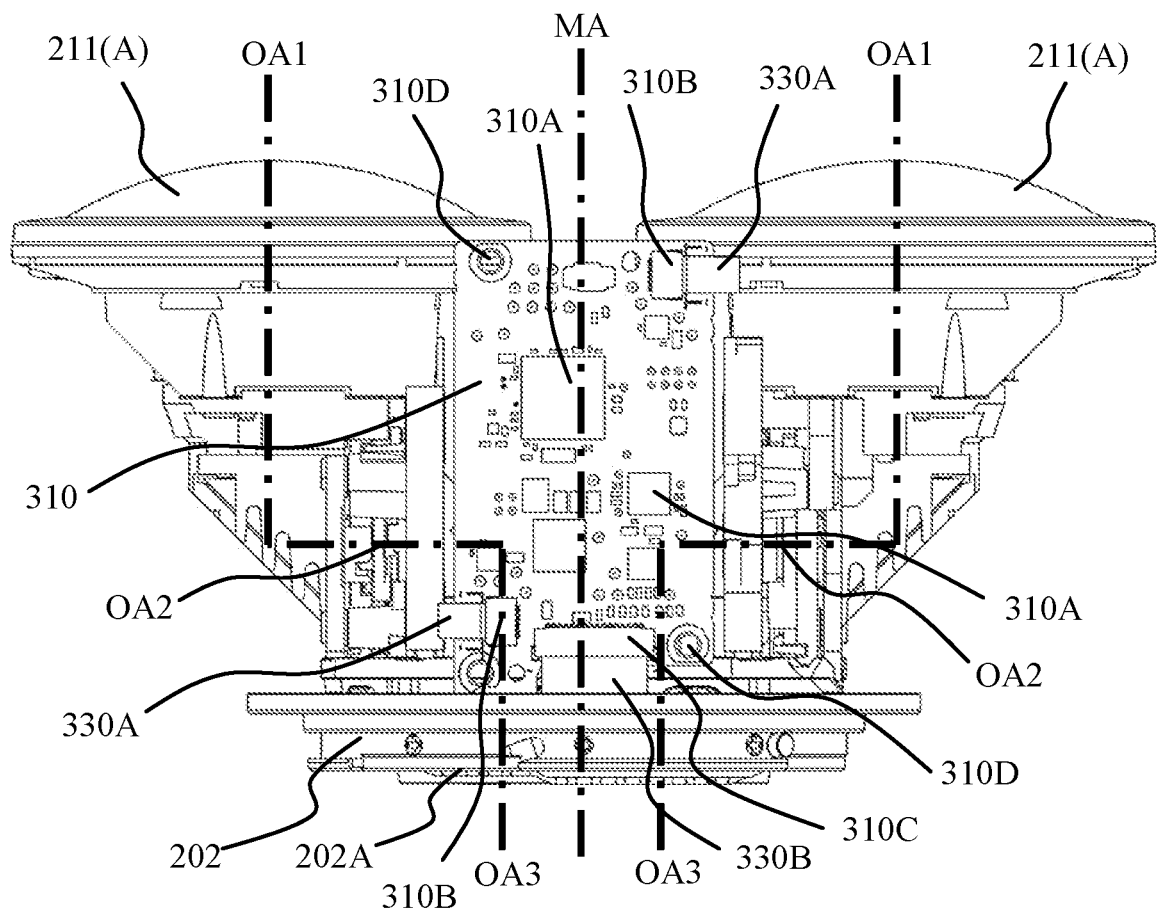
FIG. 26 is a sectional view of the lens apparatus as another example.

Next, referring to FIGS. 25 and 26, the arrangement of the circuit board 310 as another example of this embodiment will be described. FIG. 25 is a front view of the interchangeable lens 200 to show the arrangement of the circuit board 310 as another example of this embodiment, and is a view of the main part when viewed from the object side in the direction of the lens mount axis MA. FIG. 26 is a sectional view of the interchangeable lens 200 to show the arrangement of the circuit board 310 as another example, and is a view of the main part when viewed from a direction orthogonal to each of the direction of the baseline length and the direction of the first optical axis OA.

As illustrated in FIGS. 25 and 26, even if the substrate surface of the circuit board 310 (surface on which the electric element 310A is arranged) is arranged so as to be parallel to each of the direction of the baseline length direction and the first optical axis OA1, it is possible to arrange the circuit board 310 in a saved space. Even in this case, as illustrated in FIG. 25, since at least the electric element 310A is arranged inside the diameter DD of the lens mount 202, the configuration advantageous for miniaturization can be obtained. Further, as illustrated in FIG. 26, the circuit board 310 is arranged to be sandwiched by the first optical axis OA1 (OA1R, OA1L) when viewed from directions orthogonal to each of the direction of the baseline length and the direction of the first optical axis OA. Furthermore, when viewed from directions orthogonal to each of the direction of the baseline length and the direction of the first optical axis OA, the circuit board 310 is arranged to overlap with the first lens 211 and the second prism 230 which is an optical member forming the second optical axis OA2. Arranging in this way can achieve a more space-efficient arrangement.

According to this embodiment, it is possible to provide a lens apparatus and an imaging apparatus for stereoscopic photography in which a circuit board is appropriately arranged to improve space efficiency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-097777, filed on Jun. 11, 2021 and No. 2021-156696, filed on Sep. 27, 2021, which are hereby incorporated by reference herein in their entirety.

What is claimed is:

1. A lens apparatus comprising:
   a lens disposed closest to an object;
   a holder holding the lens;
   a mount for attaching the lens apparatus to an imaging apparatus;
   a circuit board configured to communicate with the imaging apparatus; and
   a base member where a first optical system, a second optical system, and the circuit board are attached,
   wherein the lens has a first lens included in the first optical system and a second lens included in the second optical system,
   wherein each of the first optical system and the second optical system is a bending optical system having a first reflective surface and a second reflective surface, and includes, in order from an object side, a first optical axis, a second optical axis of light reflected by the first reflective surface, and a third optical axis of light reflected by the second reflective surface,
   wherein at least a part of electric elements provided on the circuit board is arranged inside a diameter of the mount when viewed from the axis direction of the mount, and
   wherein the first optical system, the second optical system, and the circuit board can move integrally with the base member in a first optical direction relative to the mount.

2. The lens apparatus according to claim 1, wherein one of the cover and the exterior member include a protruding portion and the other include a groove portion to engage with the protruding portion.

3. The lens apparatus according to claim 1, wherein the lens, the holder, and the cover are integrally movable in the optical axis direction.

4. The lens apparatus according to claim 1, wherein a boundary between a lens surface on an object side of the lens and a side surface of the lens or the holder is positioned outside an inner circumference of the first opening when viewed from the optical axis direction.

5. The lens apparatus according to claim 4, wherein when a size of the first gap is changed, the boundary is positioned outside the inner circumference of the first opening when viewed from the optical axis direction.

6. The lens apparatus according to claim 1, further comprising a seal member being disposed between a first surface on an image side of the cover and a second surface facing the first surface of the holder and sealing a space between the first surface and the second surface.

7. The lens apparatus according to claim 6, wherein the seal member is disposed with a gap larger than the first gap with the cover and the holder in the direction orthogonal to the optical axis direction.

8. The lens apparatus according to claim 1, wherein the cover is disposed on an image side of an effective incident surface of the lens.

9. The lens apparatus according to claim 1, further comprising a mount for attaching the lens apparatus to an imaging apparatus simultaneously capturing two images having a parallax formed on one imaging plane to perform stereoscopic imaging.

10. The lens apparatus according to claim 1, further comprising an exterior cover covering the lens apparatus,
    wherein the lens apparatus is configured so that a lens cap can be attached and detached,
    wherein the exterior cover includes a connection portion engaging with the lens cap, and
    wherein the connection portion is disposed on an image side of an effective incident surface of the lens.

11. The lens apparatus according to claim 1,
    wherein the lens has a first lens included in a first optical system and a second lens included in a second optical system,
    wherein the cover includes a first cover lens exposing the first lens and a second cover exposing the second lens, and
    wherein the exterior member includes an opening into which the first cover is inserted and an opening into which the second cover is inserted.

12. The lens apparatus according to claim 11,
    wherein each of the first optical system and the second optical system is a bending optical system having two reflective surfaces, and
    wherein, in the first optical system and the second optical system, a first optical axis formed closest to the object, a second optical axis orthogonal to the first optical axis, and a third optical axis that is parallel to the first optical axis and is formed closest an image are set.

13. The lens apparatus according to claim 11, wherein each of the first optical system and the second optical system is a wide-angle fisheye lens.

14. The lens apparatus according to claim 11, wherein each of the first optical system and the second optical system is a fisheye lens that can capture an image at an angle of view higher than 180 degrees.

15. The lens apparatus according to claim 11, wherein each of the first optical system and the second optical system is a circumferential fisheye lens.

16. The lens apparatus according to claim 1, wherein the diameter of the mount is a fitting diameter relative to the imaging apparatus.

17. The lens apparatus according to claim 1, wherein the circuit board is arranged between the two first optical axes when viewed from a direction orthogonal to each of a distance direction between two first optical axes of the first optical system and the second optical system and a first optical axis direction.

18. The lens apparatus according to claim 1,
wherein the circuit board is positioned between the two first optical axes of the first optical system and the second optical system, and is arranged on the object side of the second optical axis and on an axis of the mount.

19. The lens apparatus according to claim 1, wherein the circuit board is arranged on an extension line of the third optical axis.

20. The lens apparatus according to claim 1, wherein a substrate surface of the circuit board is perpendicular to the axis direction of the mount.

21. The lens apparatus according to claim 1, wherein a substrate surface of the circuit board is parallel to each of a distance direction between two first optical axes of the first optical system and the second optical system and a first optical axis direction.

22. The lens apparatus according to claim 1,
wherein the circuit board includes a fixing portion, and
wherein the fixing portion first optical system, the second optical system, and the circuit board can move integrally is arranged not to overlap with the lens and the holder in each of the first optical system and the second optical system when viewed from the axis direction of the mount.

23. The lens apparatus according to claim 1, further comprising a first flexible substrate,
wherein the mount is provided with a communication unit that communicates with a camera body,
wherein the circuit board is provided with a first connector, and
wherein the first flexible substrate electrically interconnects the communication unit and the first connector, and extends in the axis direction of the mount.

24. The lens apparatus according to claim 23, further comprising a base member where the first optical system, the second optical system, and the circuit board are attached,
wherein the first flexible substrate passes a through hole formed on the base member.

25. The lens apparatus according to claim 23, further comprising:
an electronic member controlled by the circuit board, and
a second flexible substrate electrically connected to the electronic member,
wherein the circuit board includes a second connector connected to the second flexible substrate, and
wherein the second connector is arranged point-symmetrically around an axis of the mount.

26. The lens apparatus according to claim 25, wherein, when viewed from the axis direction of the mount, the first connector and the second connector are arranged not to overlap with the lens and the holder in each of the first optical system and the second optical system.

27. The lens apparatus according to claim 25, wherein, when viewed from a first optical axis direction or a direction orthogonal to each of a distance direction between two first optical axes of the first optical system and the second optical system and the first optical axis direction, the circuit board includes a region to overlap with the lens or an optical member forming the second optical axis in each of the first optical system and the second optical system.

28. The lens apparatus according to claim 1, wherein a substrate surface of the circuit board is a rectangular shape.

29. A lens cap, which is attachable to and detachable from the lens apparatus according to claim 11, comprising two slider members arranged between a first optical system including a first lens and a second optical system including a second lens,
wherein the two sliders, the first lens and the second lens are provided on the same plane orthogonal to an optical axis direction of the first lens and the second lens.

30. The lens cap according to claim 29, wherein each of the two sliders includes a connecting portion arranged between an optical axis of the first lens and an optical axis of the second lens.

31. The lens cap according to claim 29, wherein each of the two sliders includes an operation unit that is arranged at a center between an optical axis of the first lens and an optical axis of the second lens and detachably attaches the lens cap to the lens apparatus.

32. The lens cap according to claim 29, wherein each of the two sliders includes a connection portion that fits the lens apparatus.

33. An imaging apparatus comprising:
an imaging sensor; and
a lens apparatus according to claim 1.

34. The imaging apparatus according to claim 33, wherein the imaging sensor simultaneously captures two images having a parallax formed by the first optical system and the second optical system.

35. A lens apparatus comprising:
a first member holding a lens;
a second member positioned in an optical axis direction by the first member;
a third member disposed outside of the second member with respect to the optical axis direction;
a mount for attaching the lens apparatus to an imaging apparatus;
a circuit board configured to communicate with the imaging apparatus; and
a base member where a first optical system, a second optical system, and the circuit board are attached,
wherein the second member moves relatively to the third member in the optical axis direction in accordance with movement of the lens in the optical axis direction, and
wherein a gap is formed in a direction orthogonal to an optical axis of the lens between the first member and the second member,
wherein the lens has a first lens included in the first optical system and a second lens included in the second optical system,
wherein each of the first optical system and the second optical system is a bending optical system having a first reflective surface and a second reflective surface, and includes, in order from an object side, a first optical axis, a second optical axis of light reflected by the first reflective surface, and a third optical axis of light reflected by the second reflective surface,
wherein at least a part of electric elements provided on the circuit board is arranged inside a diameter of the mount when viewed from the axis direction of the mount, and
wherein the first optical system, the second optical system, and the circuit board can move integrally with the base member in a first optical direction relative to the mount.

36. The lens apparatus according to claim 35, wherein the gap is larger than a gap formed between the second member and third member.

37. The lens apparatus according to claim 35, wherein an angle where the second member is inclinable with respect to the first member is larger than an angle where the second member is inclinable with respect to the third member.

38. The lens apparatus according to claim 35, wherein one of the second member and the third member includes a protruding portion and the other include a groove portion to engage with the protruding portion.

39. The lens apparatus according to claim 35,
wherein the second member cover an edge of the lens, and
wherein the edge is not exposed when there is no gap between the first member and the second member.

40. The lens apparatus according to claim 35,
wherein the third member includes a first opening and a second opening,
wherein the first opening and the second opening are respectively formed so as to expose a lens when viewed from an object side, and
wherein the second member is disposed on an outer circumference of each lens.

41. The lens apparatus according to claim 35, wherein a focus position changes in accordance with a position change of the lens in the optical axis direction.

42. The lens apparatus in accordance with claim 1 further comprising:
a cover having a first opening to expose the lens when viewed from an optical axis direction of the lens and being positioned with the holder in the optical axis direction; and
an exterior member having a second opening to engage with an outer diameter of the cover,
wherein a first gap in a diameter direction orthogonal to the optical axis direction formed between the holder and the cover is larger than a second gap in the diameter direction formed between the exterior member and the cover.

* * * * *